(12) United States Patent
Morioka

(10) Patent No.: US 10,897,748 B2
(45) Date of Patent: Jan. 19, 2021

(54) INFORMATION PROCESSING APPARATUS, COMMUNICATION SYSTEM, INFORMATION PROCESSING METHOD, AND PROGRAM

(71) Applicant: SONY CORPORATION, Tokyo (JP)

(72) Inventor: Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 30 days.

(21) Appl. No.: 16/067,753

(22) PCT Filed: Nov. 1, 2016

(86) PCT No.: PCT/JP2016/082380
§ 371 (c)(1),
(2) Date: Jul. 2, 2018

(87) PCT Pub. No.: WO2017/119179
PCT Pub. Date: Jul. 13, 2017

(65) Prior Publication Data
US 2019/0014557 A1 Jan. 10, 2019

(30) Foreign Application Priority Data
Jan. 8, 2016 (JP) ................................. 2016-002164

(51) Int. Cl.
*H04W 72/04* (2009.01)
*H04W 52/34* (2009.01)
(Continued)

(52) U.S. Cl.
CPC ......... *H04W 72/04* (2013.01); *H04W 52/146* (2013.01); *H04W 52/247* (2013.01);
(Continued)

(58) Field of Classification Search
CPC ... H04W 28/04; H04W 72/04; H04W 72/042; H04W 88/08; H04W 72/0007; H04L 5/0007
(Continued)

(56) References Cited

U.S. PATENT DOCUMENTS

2007/0115882 A1* 5/2007 Wentink ............ H04W 74/0891
370/329
2011/0013580 A1* 1/2011 Nakasato .............. H04W 72/04
370/329
(Continued)

FOREIGN PATENT DOCUMENTS

JP  2011-120004 A  6/2011
JP  2011-254319 A  12/2011
(Continued)

OTHER PUBLICATIONS

Extended Search Report issued in European Application 16883679.9-1214 dated Mar. 13, 2019.
(Continued)

*Primary Examiner* — Peter G Solinsky
*Assistant Examiner* — Sanjay K Dewan
(74) *Attorney, Agent, or Firm* — Xsensus, LLP

(57) ABSTRACT

An information processing apparatus includes: a control unit. This control unit controls, in a case of receiving a frame for setting a transmission suppression period, a transmission suppression period for each of a plurality of transmission power levels on the basis of the frame. Further, the control unit performs control of recording reception power of a first frame for requesting data transmission and transmission power of a second frame to be transmitted in response to the first frame, in the second frame, and of transmitting the second frame. The information processing apparatus can efficiently use wireless resources.

14 Claims, 20 Drawing Sheets

(51) Int. Cl.
  *H04W 52/14* (2009.01)
  *H04W 52/24* (2009.01)
  *H04W 74/08* (2009.01)
  *H04W 52/36* (2009.01)
  H04W 84/12 (2009.01)
  H04W 52/26 (2009.01)
  H04W 52/28 (2009.01)

(52) U.S. Cl.
  CPC ......... *H04W 52/34* (2013.01); *H04W 52/362* (2013.01); *H04W 74/0816* (2013.01); *H04W 52/245* (2013.01); *H04W 52/262* (2013.01); *H04W 52/281* (2013.01); *H04W 52/283* (2013.01); *H04W 84/12* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2011/0134855 A1 | 6/2011 | Fujii et al. | |
| 2012/0047298 A1* | 2/2012 | Inoue | G06F 13/4256 710/107 |
| 2012/0155397 A1* | 6/2012 | Shaffer | H04W 28/044 370/329 |
| 2012/0243519 A1* | 9/2012 | Koskela | H04W 74/0816 370/338 |
| 2012/0327870 A1* | 12/2012 | Grandhi | H04W 28/26 370/329 |
| 2013/0070715 A1* | 3/2013 | Nanda | H04W 72/04 370/329 |
| 2013/0121293 A1* | 5/2013 | Surineni | H04W 76/14 370/329 |
| 2013/0176954 A1* | 7/2013 | Lv | H04W 74/04 370/329 |
| 2014/0023006 A1* | 1/2014 | Jeong | H04W 72/042 370/329 |
| 2014/0328269 A1 | 11/2014 | Zhu et al. | |
| 2015/0063189 A1* | 3/2015 | Merlin | H04W 72/042 370/312 |
| 2015/0319757 A1* | 11/2015 | Baldemair | H04L 5/0048 370/329 |
| 2016/0013902 A1* | 1/2016 | Cui | H04W 72/04 370/329 |
| 2017/0041959 A1* | 2/2017 | Itagaki | H04W 24/08 |
| 2017/0111096 A1* | 4/2017 | Nabetani | H04B 7/0617 |

FOREIGN PATENT DOCUMENTS

| | | | | |
|---|---|---|---|---|
| JP | 2015-226073 | * | 12/2015 | ............ H04W 72/08 |
| JP | 2015-226073 A | | 12/2015 | |
| WO | 2009/089241 | | 7/2009 | |
| WO | WO 2009/089241 A2 | * | 7/2009 | ............ H04W 52/24 |
| WO | 2012/112801 A2 | | 8/2012 | |
| WO | WO 2014/190290 A1 | | 11/2014 | |
| WO | 2015/037879 | | 3/2015 | |
| WO | WO 2015/121529 A1 | | 8/2015 | |
| WO | 2015/182044 | | 12/2015 | |

OTHER PUBLICATIONS

International Search Report dated Jan. 24, 2017 in PCT/JP2016/082380 filed Nov. 1, 2016.
Partial Supplementary European Search Report dated Nov. 30, 2018 in European Application No. 16883679.9-1214.
Simone Merlin et al: "Methods for Improving Medium Reuse in IEEE 802.11 Networks", Consumer Communications and Networking Conference, Jan. 10, 2009 (Jan. 10, 2009), pp. 1-5.
Hiroaki Morino et al: "Distance-and-Rate Dependent RTS/CTS Reservation in Wireless LAN for Enhancing Spatial Reuse", Autonomous Decentralized Systems (ISADS), 2011 10th International Symposium on, IEEE, Mar. 23, 2011 (Mar. 23, 2011), pp. 489-494.

* cited by examiner

Configuration example of frame

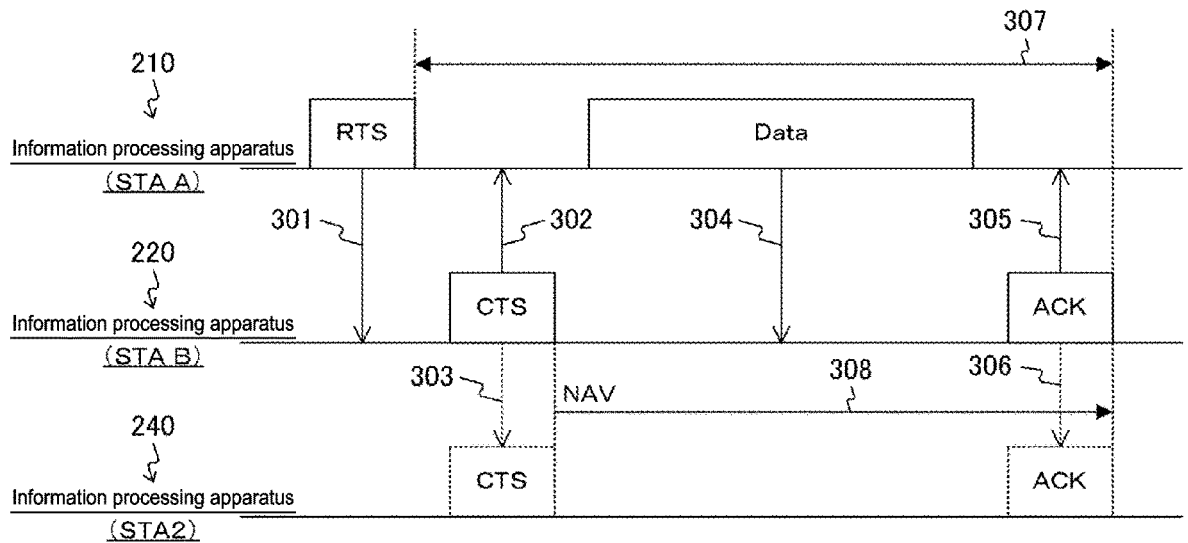
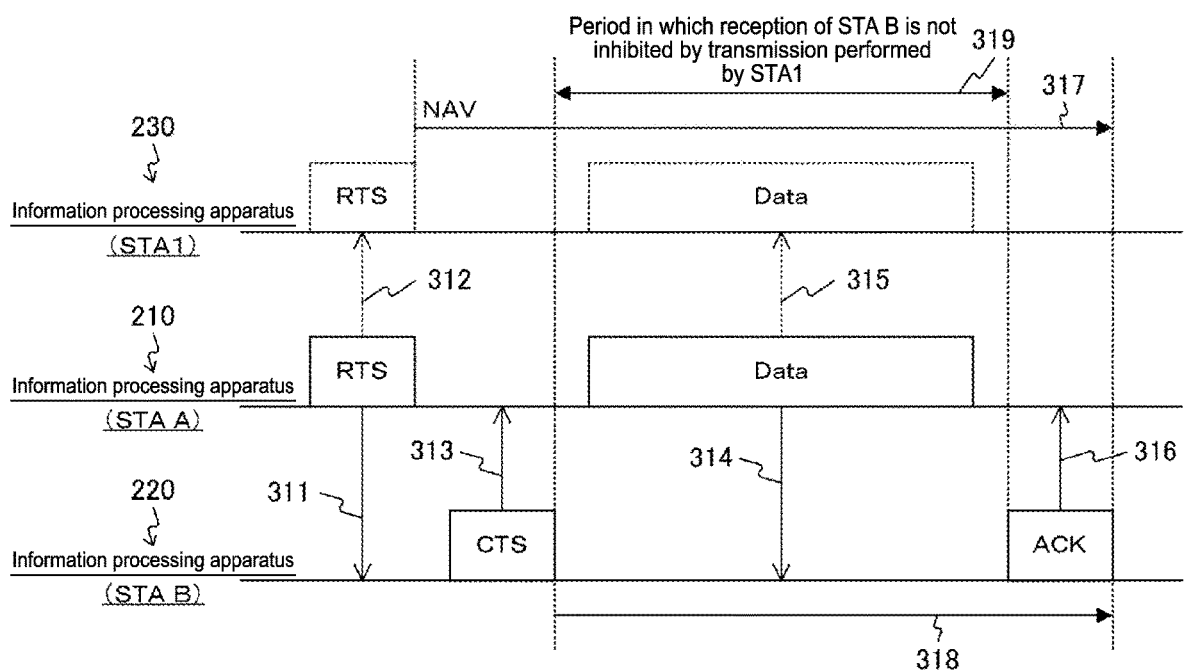
FIG.4

Correspondence example between received frame and Power Class NAV

| | |
|---|---|
| Not receive, after receiving RTS frame, CTS frame for RTS frame | Set High Power Class NAV |
| Receive, after receiving RTS frame, CTS frame for RTS frame | Set High/Mid Power Class NAV |
| Receive CTS frame without receiving RTS frame | Set High/Mid Power Class NAV |
| Receive CTS to Self frame | Set High Power Class NAV |

FIG.10

Example of setting Power Class NAV depending on method of modulating DATA to be transmitted Example of setting Power Class NAV depending on importance of DATA to be transmitted

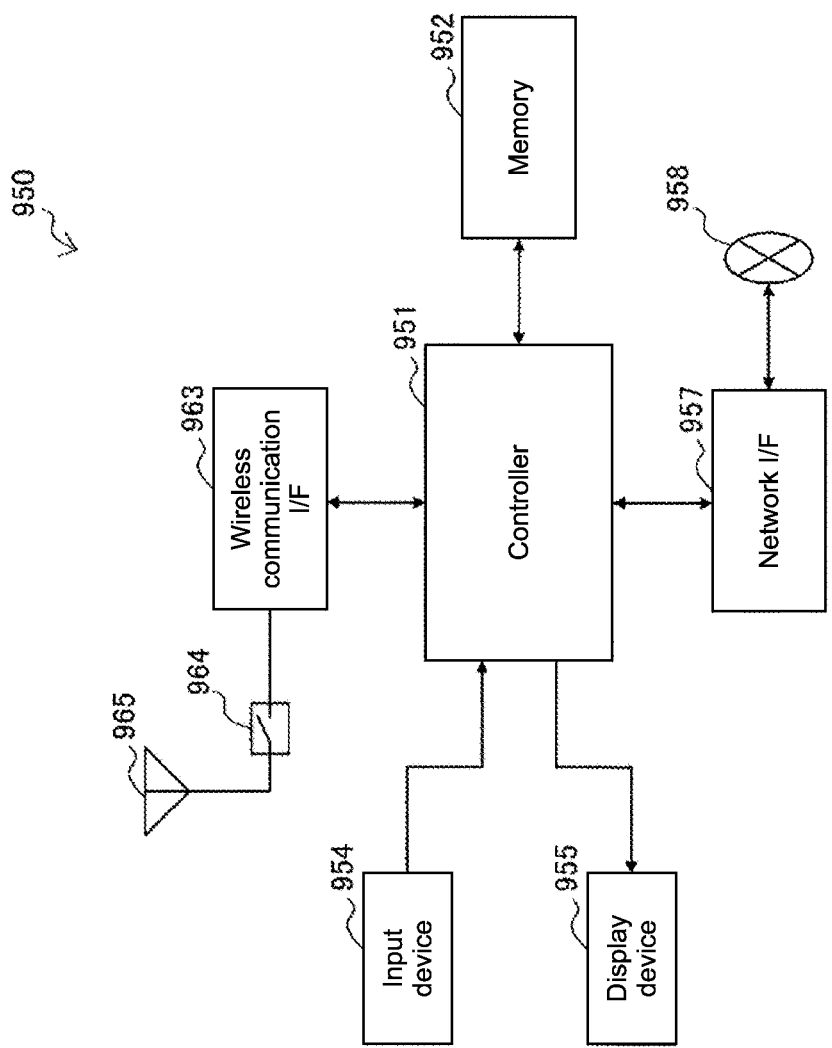

10,897,748 B2

INFORMATION PROCESSING APPARATUS, COMMUNICATION SYSTEM, INFORMATION PROCESSING METHOD, AND PROGRAM

TECHNICAL FIELD

The present technology relates to an information processing apparatus. Specifically, the present technology relates to an information processing apparatus, a communication system, and an information processing method that transmit/receive information by using wireless communication, and to a program that causes a computer to execute the method.

BACKGROUND ART

Conventionally, there is a wireless communication technology that transmits/receives information by using wireless communication. For example, a communication method of transmitting/receiving information between information processing apparatuses by using a wireless LAN is proposed.

Further, a technology for setting a NAV (Network Allocation Vector) in order to avoid packet collision during communication between information processing apparatuses in a network is proposed.

Further, for example, an information processing apparatus that sets a transmission suppression period in accordance with reception of at least one of a frame of which the destination is not the information processing apparatus itself and a frame that is transmitted in response to the frame is proposed (see, for example, Patent Literature 1).

CITATION LIST

Patent Literature

Patent Literature 1: Japanese Patent Application Laid-open No. 2015-226073

DISCLOSURE OF INVENTION

Technical Problem

In the above-mentioned existing technology, in the case where transmission suppression is set, it is possible to clear the transmission suppression period on the basis of a communication quality during reception of at least one of the frames.

In this regard, taking into account the positions of the apparatuses, it is expected that there are apparatuses in which no packet collision at the time of communication occurs even during the transmission suppression period. In such a case, it is important to avoid packet collision at the time of communication between the information processing apparatuses and efficiently use wireless resources.

The present technology has been made in view of the above circumstances to efficiently use wireless resources.

Solution to Problem

The present technology has been made to solve the above-mentioned problems, and a first aspect thereof is an information processing apparatus including a control unit that controls, in a case of receiving a frame for setting a transmission suppression period, a transmission suppression period for each of a plurality of transmission power levels on the basis of the frame, an information processing method therefor, and a program that causes a computer to execute the method. Accordingly, there is an effect of controlling, in a case of receiving a frame for setting a transmission suppression period, a transmission suppression period for each of a plurality of transmission power levels on the basis of the frame.

Further, in the first aspect, the control unit may control the transmission suppression period for each of the plurality of transmission power levels on the basis of an attribution of the frame. Accordingly, there is an effect of controlling the transmission suppression period for each of the plurality of transmission power levels on the basis of an attribution of the frame.

Further, in the first aspect, the control unit may control the transmission suppression period for each of the plurality of transmission power levels on the basis of reception power of the frame. Accordingly, there is an effect of controlling the transmission suppression period for each of the plurality of transmission power levels on the basis of reception power of the frame.

Further, in the first aspect, the control unit may control the transmission suppression period for each of the plurality of transmission power levels on the basis of information included in the frame. Accordingly, there is an effect of controlling the transmission suppression period for each of the plurality of transmission power levels on the basis of information included in the frame.

Further, in the first aspect, the information included in the frame may be at least one of information for identifying a data transmission side or a data reception side, a size of the data, a modulation method of the data, an importance of the data, and a distance between a transmission apparatus that transmits the data and a reception apparatus that receives the data. Accordingly, there is an effect of controlling the transmission suppression period for each of the plurality of transmission power levels on the basis of at least one of the pieces of information.

Further, in the first aspect, the control unit may control, in a case where the frame includes the size of the data, the transmission suppression period for each of the plurality of transmission power levels, in a period specified on the basis of the size of the data. Accordingly, there is an effect of controlling, in a case where the frame includes the size of the data, the transmission suppression period for each of the plurality of transmission power levels, in a period specified on the basis of the size of the data.

Further, in the first aspect, the control unit may control, in a case where the frame includes the modulation method of the data, the transmission suppression period for each of the plurality of transmission power levels on the basis of interference resistance of the modulation method of the data. Accordingly, there is an effect of controlling, in a case where the frame includes the modulation method of the data, the transmission suppression period for each of the plurality of transmission power levels on the basis of interference resistance of the modulation method of the data.

Further, in the first aspect, the control unit may set, in a case where the frame includes the importance of the data and the importance of the data is higher than a reference, the lowest transmission power level of the plurality of transmission power levels. Accordingly, there is an effect of setting, in a case where the frame includes the importance of the data and the importance of the data is higher than a reference, the lowest transmission power level among the plurality of transmission power levels.

Further, in the first aspect, the control unit may set, in a case where the frame includes the distance between the transmission apparatus that transmits the data and the reception apparatus that receives the data and the distance is shorter than a reference, the highest transmission power level among the plurality of transmission power levels. Accordingly, there is an effect of setting, in a case where the frame includes the distance between the transmission apparatus that transmits the data and the reception apparatus that receives the data and the distance is shorter than a reference, the highest transmission power level among the plurality of transmission power levels.

Further, a second aspect of the present technology is an information processing apparatus including a control unit that performs control of recording reception power of a first frame for requesting data transmission and transmission power of a second frame to be transmitted in response to the first frame, in the second frame, and of transmitting the second frame, an information processing method therefore, and a program that causes a computer to execute the method. Accordingly, there is an effect of recording reception power of a first frame for requesting data transmission and transmission power of a second frame to be transmitted in response to the first frame, in the second frame, and of transmitting the second frame.

Further, in the second aspect, the control unit may perform, in a case of receiving a frame for setting a transmission suppression period, control of recording, in the second frame, information for notifying that a transmission suppression period for each of a plurality of transmission power levels is allowed to be controlled on the basis of the frame, and of transmitting the second frame. Accordingly, there is an effect of recording, in a case of receiving a frame for setting a transmission suppression period, in the second frame, information for notifying that a transmission suppression period for each of a plurality of transmission power levels is allowed to be controlled on the basis of the frame, and of transmitting the second frame.

Further, in the second aspect, the control unit may perform control of recording, in the second frame, information to be used when controlling the transmission suppression period for each of the plurality of transmission power levels, and of transmitting the second frame. Accordingly, there is an effect of recording, in the second frame, information to be used when controlling the transmission suppression period for each of the plurality of transmission power levels, and of transmitting the second frame.

Further, a third aspect of the present technology is a communication system, including: a first information processing apparatus that transmits a frame for setting a transmission suppression period; and a second information processing apparatus that controls, in a case of receiving the frame, a transmission suppression period for each of a plurality of transmission power levels on the basis of the frame, an information processing method therefor, and a program that causes a computer to execute the method. Accordingly, there is an effect of transmitting, by a first information processing apparatus, a frame for setting a transmission suppression period, and controlling, by a second information processing apparatus, in a case of receiving the frame, a transmission suppression period for each of a plurality of transmission power levels on the basis of the frame.

Advantageous Effects of Invention

According to the present technology, it is possible to exert an excellent effect of being capable of effectively using wireless resources. It should be noted that the effect described here is not necessarily limitative and may be any effect described in the present disclosure.

BRIEF DESCRIPTION OF DRAWINGS

FIG. 4 is a diagram showing an example of setting a NAV that is the basis of the present technology.

FIG. 10 is a diagram showing an example of a correspondence relationship between the type of the frame received by the information processing apparatus 100 according to the embodiment of the present technology, and a Power Class NAV set in the information processing apparatus 100.

FIG. 21 is a block diagram showing an example of a schematic configuration of a wireless access point.

MODE(S) FOR CARRYING OUT THE INVENTION

Hereinafter, an embodiment for carrying out the present technology (hereinafter, referred to as embodiment) will be described. Descriptions will be made in the following order.

1. Embodiment (example of controlling, in the case of receiving a frame for setting a transmission suppression period, a transmission suppression period for each of a plurality of transmission power levels on the basis of the frame)
2. Application Example

1. Embodiment

[Functional Configuration Example of Information Processing Apparatus]

Figure 1:
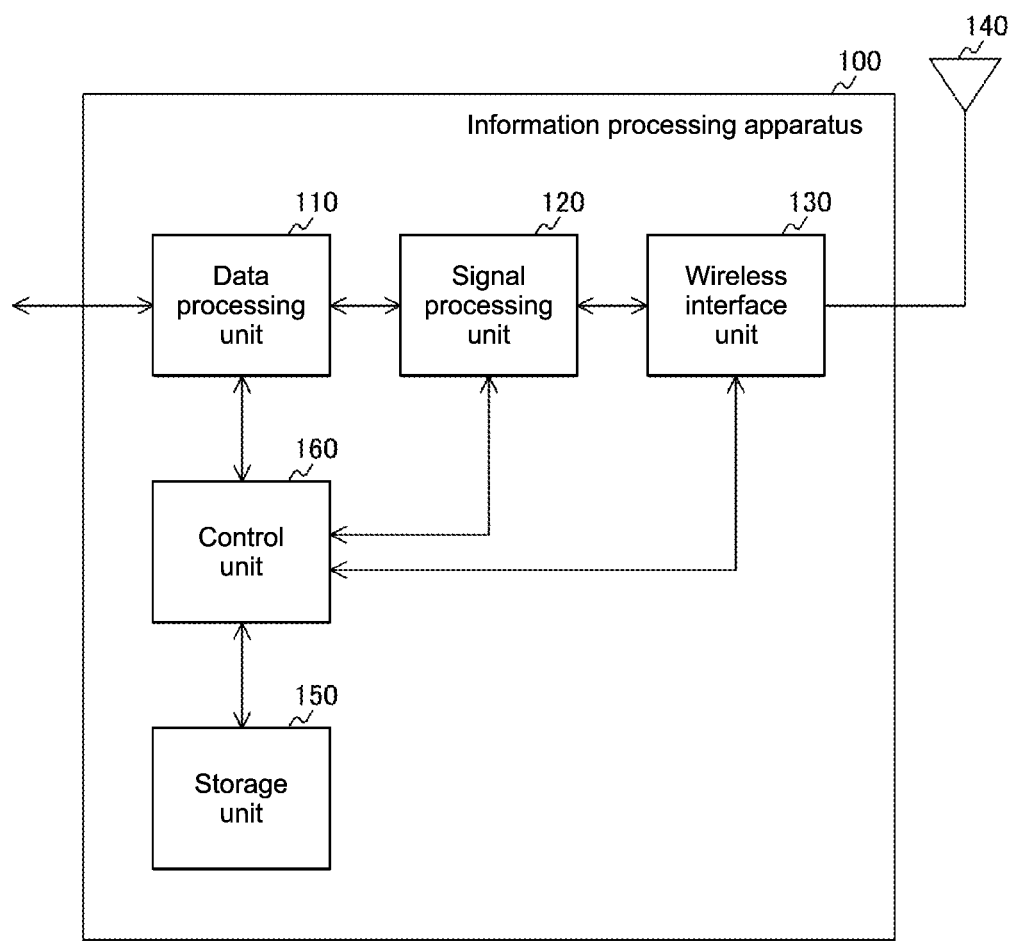
FIG. 1 is a block diagram showing a functional configuration example of an information processing apparatus 100 according to an embodiment of the present technology.

FIG. 1 is a block diagram showing a functional configuration example of an information processing apparatus 100 according to an embodiment of the present technology.

The information processing apparatus 100 includes a data processing unit 110, a signal processing unit 120, a wireless interface unit 130, an antenna 140, a storage unit 150, and a control unit 160.

For example, the information processing apparatus 100 may be a fixed or portable information processing apparatus having a wireless communication function. Note that the fixed information processing apparatus is, for example, an information processing apparatus such as an access point (Access Point), a base station, and the like in a wireless LAN (Local Area Network) system. Further, the portable information processing apparatus is, for example, an information processing apparatus such as a smartphone, a cellular phone, and a tablet terminal.

Further, the information processing apparatus 100 has a communication function conforming to the wireless LAN standard of IEEE (Institute of Electrical and Electronic Engineers) 802.11, for example. For example, it may have a communication function conforming to the wireless LAN standard of IEEE802.11ax. Further, as the wireless LAN, for example, a Wi-Fi (Wireless Fidelity), Wi-Fi Direct, or Wi-Fi CERTIFIED Miracast specification (technical specification title: Wi-Fi Display) can be used. Further, wireless communication using another communication method may be performed.

Further, the information processing apparatus 100 may be an apparatus compatible with MU-MIMO (Multi User MIMO), for example. In this case, the information processing apparatus 100 is capable of simultaneously performing transmission to a plurality of apparatuses. Further, in the case of simultaneously performing transmission to a plurality of apparatuses, the information processing apparatus 100 is capable of receiving CTS (Clear to Send) frames from a plurality of apparatuses.

The data processing unit 110 processes various types of data under the control of the control unit 160. For example, the data processing unit 110 performs processing of adding a MAC (Media Access Control) header, an error detection code, and the like to data from an upper layer, and generates a packet for wireless transmission. Then, the data processing unit 110 supplies the generated packet to the signal processing unit 120.

Further, for example, when receiving data, the data processing unit 110 performs analysis of a header, processing of detecting a packet error, and the like on the bit string received from the signal processing unit 120, and supplies the processed data to the upper layer. Further, for example, the data processing unit 110 notifies the control unit 160 of the analysis result of the header, the detection result of the packet error, and the like.

The signal processing unit 120 performs various kinds of signal processing under the control of the control unit 160. For example, at the time of transmission, the signal processing unit 120 encodes the input data from the data processing unit 110, on the basis of the coding and modulation scheme set by the control unit 160, and adds a preamble and a PHY header thereto. Then, the signal processing unit 120 supplies a transmission symbol stream obtained by the signal processing to the wireless interface unit 130.

Further, for example, at the time of reception, the signal processing unit 120 detects a preamble and a PHY header from the reception symbol stream received from the wireless interface unit 130, performs decoding processing thereon, and supplies it to the data processing unit 110. Further, for example, the signal processing unit 120 notifies the control unit 160 of the detection result of the PHY header and the like.

The wireless interface unit 130 is an interface for communicating with another information processing apparatus and transmitting/receiving various kinds of information by using wireless communication under the control of the control unit 160. For example, at the time of transmission, the wireless interface unit 130 converts the input from the signal processing unit 120 into an analog signal, amplifies and filters the analog signal, up-converts the resulting signal into one having a predetermined frequency, and transmits it to the antenna 140.

Further, for example, at the time of reception, the wireless interface unit 130 performs processing reverse to the above-mentioned processing on the input from the antenna 140, and supplies the processing result to the signal processing unit 120.

Further, control of transmission power of data transmitted from the wireless interface unit 130 is performed by the control unit 160.

The storage unit 150 plays a role of a working area for data processing by the control unit 160, and has a function as a storage medium that stores various kinds of data. As the storage unit 150, for example, a storage medium such as a non-volatile memory, a magnetic disc, an optical disc, and an MO (Magneto Optical) disc can be used. Note that as the non-volatile memory, for example, an EEPROM (Electrically Erasable Programmable Read-Only Memory), or an EPROM (Erasable Programmable ROM) can be used. Further, as the magnetic disc, for example, a hard disc or a discoid magnetic disc can be used. Further, as the optical disc, for example, a CD (Compact Disc), a DVD-R (Digital Versatile Disc Recordable), or a BD (Blu-Ray Disc (registered trademark)) can be used.

The control unit 160 controls the reception operation and the transmission operation of each of the data processing unit 110, the signal processing unit 120, and the wireless interface unit 130. For example, the control unit 160 performs transmission/reception of information between the respective units, setting of communication parameters, and scheduling of packets in the data processing unit 110.

Further, for example, in the case of receiving a frame for setting a transmission suppression period (NAV (Network Allocation Vector), the control unit 160 controls a transmission suppression period for each of a plurality of transmission power levels on the basis of the frame. Note that the plurality of transmission power levels represent, for example, three transmission power levels (High Power Class NAV, Mid Power Class NAV, and Low Power Class NAV) shown in FIG. 5.

Further, for example, the control unit 160 performs control of recording reception power of a first frame for requesting data transmission and transmission power of a second frame to be transmitted in response to the first frame, in the second frame, and of transmitting the second frame. Note that the first frame is, for example, an RTS (Request to Send) frame. Further, the second frame is, for example, a CTS (Clear to Send) frame. Further, the information (reception power and transmission power) can be recorded in a Reuse Info 173 shown in FIG. 2.

[Configuration Example of Frame]

Figure 2:
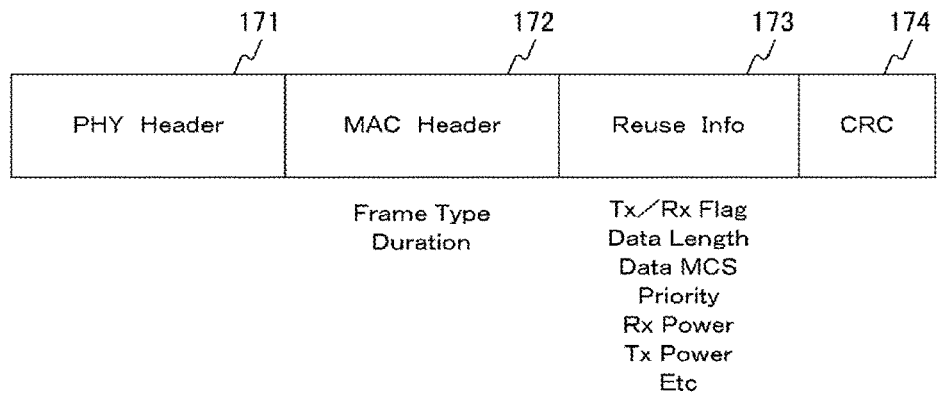
FIG. 2 is a diagram showing a configuration example of a frame to be transmitted/received by the information processing apparatus 100 according to the embodiment of the present technology.

FIG. 2 is a diagram showing a configuration example of a frame to be transmitted/received by the information processing apparatus 100 according to the embodiment of the present technology.

The frame includes a PHY header (Header) 171, a MAC header (Header) 172, the Reuse Info 173, and a CRC (Cyclic Redundancy Check) 174.

In the PHY header 171, a BSS (Basic Service Set) Color, Length, and the like are stored.

The BSS Color is information introduced in IEEE802.11ah. For example, an AP (Access Point) declares an individual BSS Color for each BSS, describes the BSS Color in the PHY header 171 of a frame, and transmits the frame. The apparatus that receives this frame is capable of determining whether or not the received frame is a frame for its BSS (i.e., whether or not there is a possibility that the frame is addressed to the apparatus itself). In this way, whether or not there is a possibility that the frame is addressed to the apparatus itself can be determined at the introductory portion of the frame. Therefore, in the case where the received frame is a frame addressed to a third party (frame that is not addressed to the apparatus itself), the subsequent processing can be omitted to suppress the power consumption relating to the reception.

The Length is information for identifying the length of the frame.

In the MAC header 172, a destination address (Rx Address), a frame type, a Duration, and the like are stored.

The frame type is information for identifying an attribution of the frame (type of the frame).

The Duration is duration information regarding NAV setting.

In the Reuse Info 173, an Rx Flag, a Data Length, a Data MCS (Modulation and Coding Scheme), a Priority, an Rx Power, a Tx Power, and the like are stored.

The Tx/Rx Flag represents a DATA transmission/reception flag, and is information for identifying a data transmission side or a data reception side. The Data Length is information for identifying a length (length in a time axis, size of data) of data to be transmitted.

The Data MCS is information for identifying a modulation method of data to be transmitted. The Priority is information for identifying an importance of data to be transmitted.

The Rx Power is information for identifying reception power of a frame. The Tx Power is information for identifying transmission power of a frame.

Note that these pieces of information are only examples, and other information may be stored in the frame. For example, a distance between a transmission apparatus that transmits data and a reception apparatus that receives the data may be stored. Further, a part of storing of these pieces of information may be omitted.

Note that in the IEEE802.11, an unlicensed band is used for performing wireless communication. In this regard, it is assumed that the operation is performed in an environment in which a plurality of different networks are mixed. An example of such an environment will be shown in FIG. 3.

[Configuration Example of Communication System]

Figure 3:
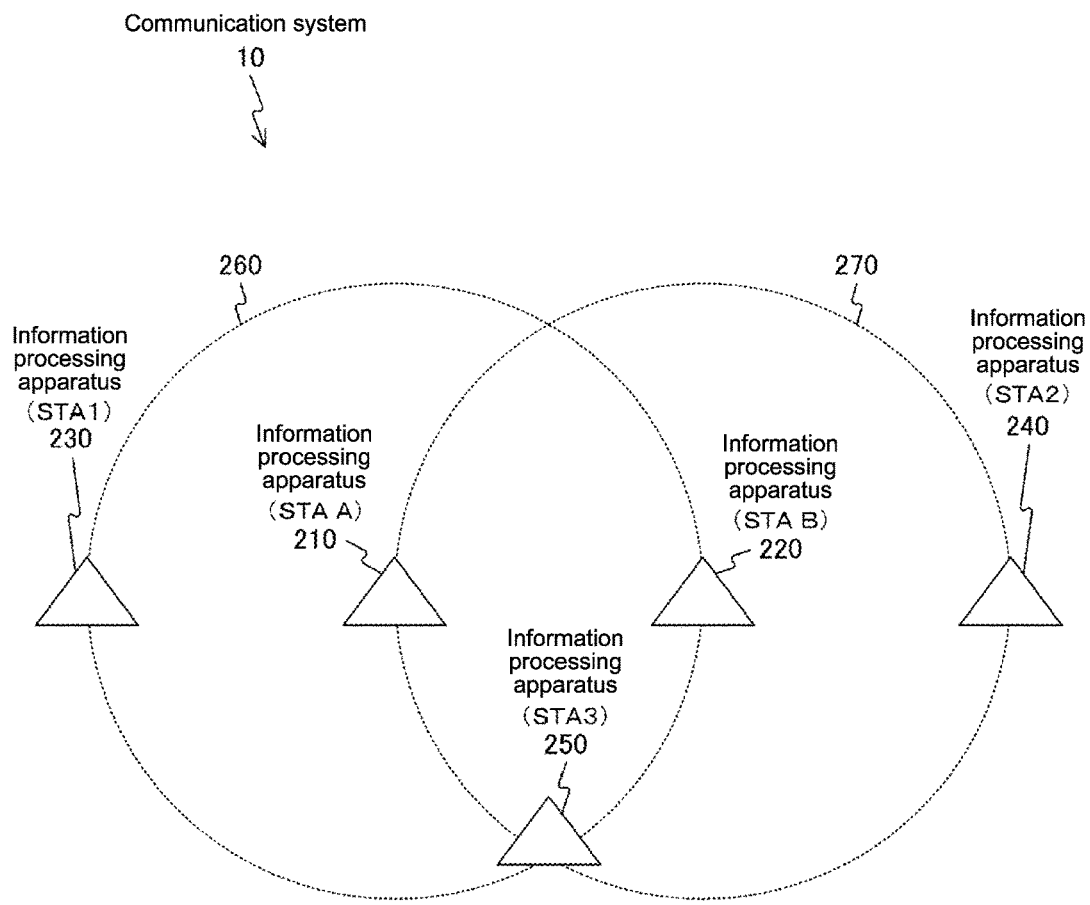
FIG. 3 is a diagram showing an example of a system configuration of a communication system 10 according to the embodiment of the present technology.

FIG. 3 is a diagram showing an example of a system configuration of a communication system 10 according to the embodiment of the present technology.

The communication system 10 is a wireless network including an information processing apparatus (STA A) 210, an information processing apparatus (STA B) 220, an information processing apparatus (STA1) 230, an information processing apparatus (STA2) 240, and an information processing apparatus (STA3) 250. Note that in FIG. 3, the information processing apparatuses (STA) are each represented by a triangular shape. Further, a radio wave reachable range 260 of the information processing apparatus (STA A) 210 is represented by a broken line circle around the information processing apparatus (STA A) 210. Further, a radio wave reachable range 270 of the information processing apparatus (STA B) 220 is represented by a broken line circle around the information processing apparatus (STA B) 220.

Further, in FIG. 3, an example in which the information processing apparatuses (STA) constituting the communication system 10 perform transmission power control is shown.

Now, a hidden terminal that occurs in an environment in which a plurality of different networks are mixed will be described with reference to FIG. 3.

For example, a case where the information processing apparatus (STA A) 210 transmits a frame to the information processing apparatus (STA B) 220 will be considered. In this case, since there is the information processing apparatus (STA2) 240 outside the radio wave reachable range 260 of the information processing apparatus (STA A) 210, the information processing apparatus (STA2) 240 cannot detect a frame from the information processing apparatus (STA A) 210. Therefore, it is expected that the information processing apparatus (STA2) 240 determines that the wireless band is not used, and starts transmitting a frame of the information processing apparatus itself. In this case, while the information processing apparatus (STA A) 210 transmits a frame, another frame is transmitted from the information processing apparatus (STA2) 240. When the frame transmission from the information processing apparatus (STA A) 210 and the frame transmission from the information processing apparatus (STA2) 240 are performed in the same time period as described above, the frame from the information processing apparatus (STA A) 210 and the frame from the information processing apparatus (STA2) 240 collide with each other, and the information processing apparatus (STA B) 220 may fail to receive a desired signal.

In order to prevent such signal reception failure, a method of NAV is adopted in the IEEE802.11. This example will be shown in FIG. 4.

[Example of Setting NAV]

FIG. 4 is a diagram showing an example of setting a NAV that is the basis of the present technology. Note that the horizontal axis shown in FIG. 4 represents the time axis. Further, in FIG. 4, on the upper side of each of the time axes corresponding to the information processing apparatus (STA A) 210 and the information processing apparatus (STA B) 220, data to be transmitted is represented by a rectangle to which the content thereof is internally attached. Further, on the upper side of the time axis corresponding to the information processing apparatus (STA2) 240, detected data is represented by a rectangle to which the content thereof is internally attached.

In Part a and Part b of FIG. 4, an example of a case where a NAV is set to another apparatus by exchanging an RTS frame and CTS frame between the information processing apparatus (STA A) 210 and the information processing apparatus (STA B) 220 is shown.

In Part a of FIG. 4, an example of a case where a NAV is set to the information processing apparatus (STA2) 240 by a CTS frame transmitted from the information processing apparatus (STA B) 220 is shown.

First, the information processing apparatus (STA A) 210 transmits an RTS frame to the information processing apparatus (STA B) 220 before transmitting data addressed to the information processing apparatus (STA B) 220 (301). In the Duration in this RTS frame, a NAV setting duration (transmission suppression period) is stored. Further, in the information processing apparatus (STA A) 210, a NAV based on virtual carrier sense has been set for the period stored in the Duration in the RTS frame (307).

Further, in the case of receiving the RTS frame, the information processing apparatus (STA B) 220 transmits a CTS frame for the RTS frame to the information processing apparatus (STA A) 210 (302). In the Duration in this CTS frame, a NAV setting duration (transmission suppression period) is stored. Further, in the information processing apparatus (STA B) 220, a NAV based on virtual carrier sense has been set for the period stored in the Duration in the CTS frame (308).

As described above, between the information processing apparatus (STA A) 210 and the information processing apparatus (STA B) 220, frame exchange of the RTS frame and the CTS frame is performed (301, and 302). Further, in each of the RTS frame and the CTS frame, information for setting a period in which frame transmission is suppressed (transmission suppression period) by the apparatus (peripheral apparatus) that receives the frame is stored.

Note that since the information processing apparatus (STA2) 240 is capable of detecting a CTS frame transmitted from the information processing apparatus (STA B) 220 (303), a NAV is set in the information processing apparatus (STA2) 240 (308).

As described above, data (Data) transmission from the information processing apparatus (STA A) 210 to the information processing apparatus (STA B) 220 is performed (304) during a period (307, 308) in which a NAV has been set. Further, as necessary, receipt acknowledgement (Ack) is exchanged (305).

Further, the information processing apparatus (STA2) 240 that receives the CTS frame suppresses transmission by the information processing apparatus itself until frame exchange between the information processing apparatus (STA A) 210 and the information processing apparatus (STA B) 220 is finished (308). Therefore, it is possible to avoid the above-mentioned packet collision.

In Part b of FIG. 4, an example of a case where a NAV is set to the information processing apparatus (STA1) 230 by the RTS frame transmitted from the information processing apparatus (STA A) 210 is shown.

Similarly to Part a of FIG. 4, frame exchange of the RTS frame and the CTS frame is performed (311, 313) between the information processing apparatus (STA A) 210 and the information processing apparatus (STA B) 220. Further, in each of the RTS frame and the CTS frame, information for setting a period in which frame transmission is suppressed (transmission suppression period) by the apparatus (peripheral apparatus) that receives the frame is stored.

Note that since the information processing apparatus (STA1) 230 is capable of detecting the RTS frame transmitted from the information processing apparatus (STA A) 210 (312), a NAV is set in the information processing apparatus (STA1) 230 (317).

As described above, data (Data) transmission from the information processing apparatus (STA A) 210 to the information processing apparatus (STA B) 220 is performed (314) during a period (317, 318) in which a VAN has been set. Further, as necessary, receipt acknowledgement (Ack) is exchanged (316).

Further, the information processing apparatus (STA1) 230 that receives the RTS frame suppresses transmission by the information processing apparatus itself until frame exchange between the information processing apparatus (STA A) 210 and the information processing apparatus (STA B) 220 is finished (317). Therefore, it is possible to avoid the above-mentioned packet collision.

Here, considering the positional relationship shown in FIG. 3, the frame transmitted from the information processing apparatus (STA1) 230 does not reach the information processing apparatus (STA B) 220. Therefore, for example, the frame transmitted by the information processing apparatus (STA1) 230 does not reach the information processing apparatus (STA B) 220 while the information processing apparatus (STA A) 210 transmits the frame addressed to the information processing apparatus (STA B) 220 (319). As described above, even in the case where the information processing apparatus (STA1) 230 transmits a frame addressed to another apparatus, it is considered that no collision due to the frame from the information processing apparatus (STA1) 230 occurs in the information processing apparatus (STA B) 220.

In this regard, it is considered that it does not need to set a NAV in the information processing apparatus (STA1) 230 in a period (319) during the information processing apparatus (STA A) 210 transmits a frame addressed to the information processing apparatus (STA B) 220. As described above, taking into account the positions of the apparatuses, it is expected that there are apparatuses in which no packet collision at the time of communication occurs (or apparatuses with a low possibility of packet collision) even when a NAV is being set. In such a case, it is important to avoid packet collision at the time of communication between the information processing apparatuses and efficiently use wireless resources.

In this regard, in the embodiment of the present technology, an example of setting a NAV for each transmission power improve the frequency utilization efficiency is shown.

[Example of Setting NAV for Each Transmission Power by Information Processing Apparatus (STA1)]

Figure 5:
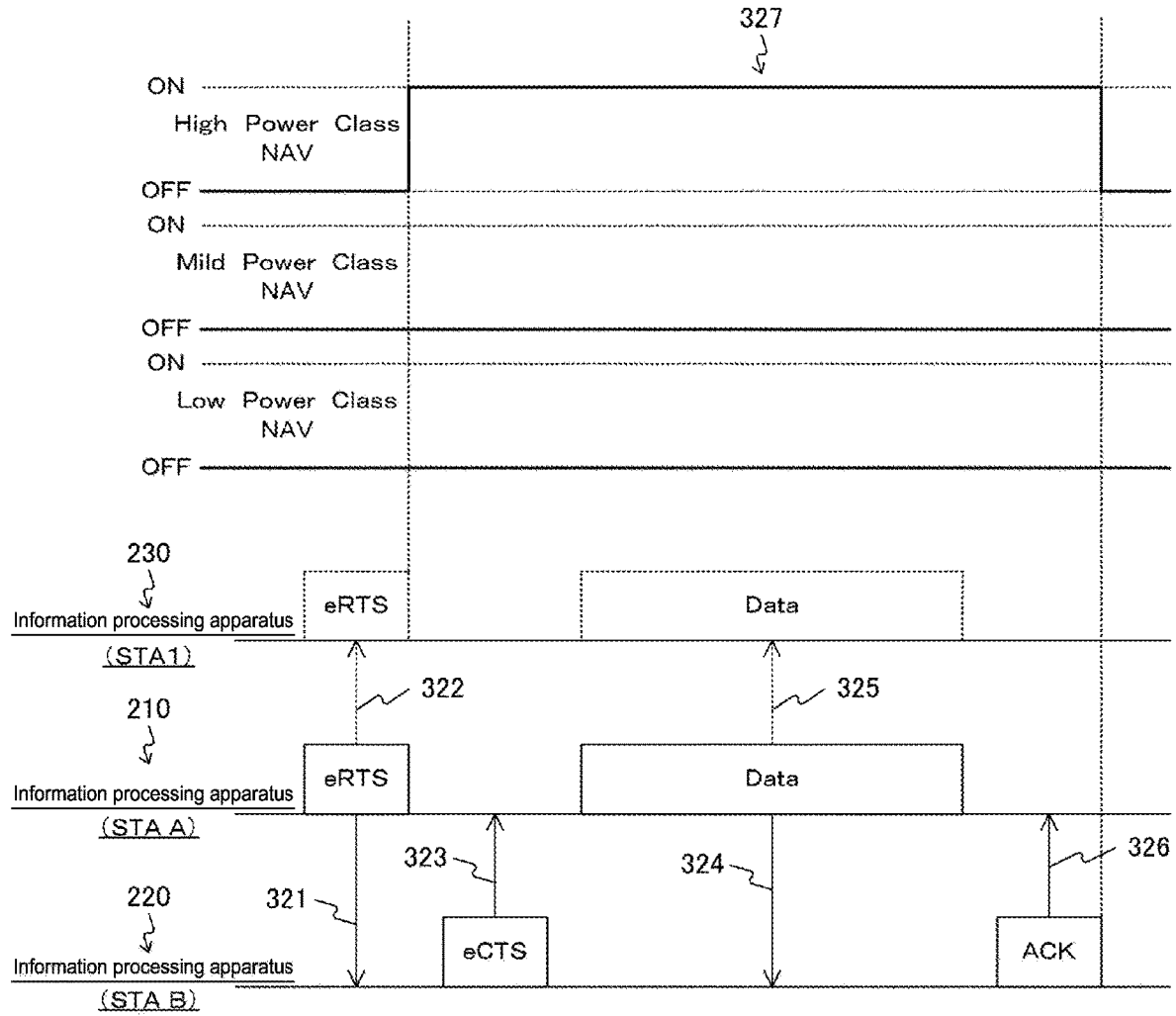
FIG. 5 is a diagram showing an example of setting a NAV for each transmission power by an information processing apparatus (STA1) 230 according to the embodiment of the present technology.

FIG. 5 is a diagram showing an example of setting a NAV for each transmission power by the information processing apparatus (STA1) 230 according to the embodiment of the present technology.

Note that the horizontal axis shown in FIG. 5 represents the time axis. Further, in FIG. 5, on the upper side of each of the time axes corresponding to the information processing apparatus (STA A) 210 and the information processing apparatus (STA B) 220, data to be transmitted is represented by a rectangle to which the content thereof is internally attached. Further, on the upper side of the time axis corresponding to the information processing apparatus (STA1) 230, received data is represented by a rectangle to which the content thereof is internally attached.

Further, in FIG. 5, three axes on the upper side of the time axis corresponding to the information processing apparatus (STA1) 230 represent the setting state of a NAV for each transmission power. Specifically, an example in which three transmission power classes (transmission power levels) of High Power Class NAV, Mid Power Class NAV, and Low Power Class NAV are defined is shown. In addition, the setting state of a NAV for each transmission power class in the information processing apparatus (STA1) 230 is shown. That is, whether or not each of the three transmission power classes is on or off is shown by a thick line. Further, in each figure shown below, three transmission power classes are shown in the same way.

Note that in FIG. 5, only the setting of the Power Class NAV of the information processing apparatus (STA1) 230 is shown, and illustration and description of setting of the Power Class NAV of other apparatuses are omitted.

First, the information processing apparatus (STA A) 210 transmits an eRTS frame to the information processing apparatus (STA B) 220 (321) before transmitting data addressed to the information processing apparatus (STA B) 220. Further, in the case of receiving the eRTS frame, the information processing apparatus (STA B) 220 transmits an eCTS frame for the eRTS to the information processing apparatus (STA A) 210 (322). Note that the eRTS frame and the eCTS frame respectively correspond to the above-mentioned RTS frame and the CTS frame. Further, in the eRTS frame and the eCTS frame, additional information (e.g., information of the Reuse Info 173 shown in FIG. 2) is stored as necessary.

As described above, frame exchange of the eRTS frame and the eCTS frame is performed (321, 323) between the information processing apparatus (STA A) 210 and the information processing apparatus (STA B) 220. Further, in each of the eRTS frame and the eCTS frame, information for setting a period in which frame transmission is suppressed (transmission suppression period) by the apparatus (peripheral apparatus) that receives the frame is stored.

Note that the information processing apparatus (STA1) 230 is capable of detecting the eRTS frame transmitted from the information processing apparatus (STA A) 210 (322). Therefore, after detecting the eRTS frame, the information processing apparatus (STA1) 230 is capable of grasping that the information processing apparatus (STA A) 210 is planning to transmit a DATA frame. Further, it is preferable that the information processing apparatus (STA1) 230 refrains from performing transmission at the level (High) of inhibiting transmission from the information processing apparatus (STA A) 210 and reception of a response frame (Ack) in response thereto by the information processing apparatus (STA A) 210.

Note that the ACK signal is generally transmitted by a modulation method resistant to interference in many cases. Therefore, in the case where the information processing apparatus (STA1) 230 performs transmission with transmission power not higher than the Mid Power level, it is conceivable that ACK reception by the information processing apparatus (STA A) 210 can be performed.

Considering the above, it is considered that the information processing apparatus (STA1) 230 is capable of performing transmission at the (Mid/Low) level lower than the level (High) of inhibiting transmission/reception by the information processing apparatus (STA A) 210.

In this regard, the information processing apparatus (STA1) 230 sets the respective Power Class NAVs so as to be capable of continuing to perform transmission at the low (Mid/Low) level. Specifically, the information processing apparatus (STA1) 230 sets the High Power Class NAV to on, and maintains the off state of the Mid Power Class NAV and the Low Power Class NAV.

As described above, data (Data) transmission from the information processing apparatus (STA A) 210 to the information processing apparatus (STA B) 220 is performed (324) during a period (327) in which the High Power Class NAV has been set to on. Further, as necessary, receipt acknowledgement (Ack) is exchanged (326).

Further, the information processing apparatus (STA1) 230 in which the High Power Class NAV is set to on is capable of performing transmission at the low (Mid/Low) level by the information processing apparatus itself in the period (327).

[Example of Setting NAV for Each Transmission Power by Information Processing Apparatus (STA2)]

Figure 6:
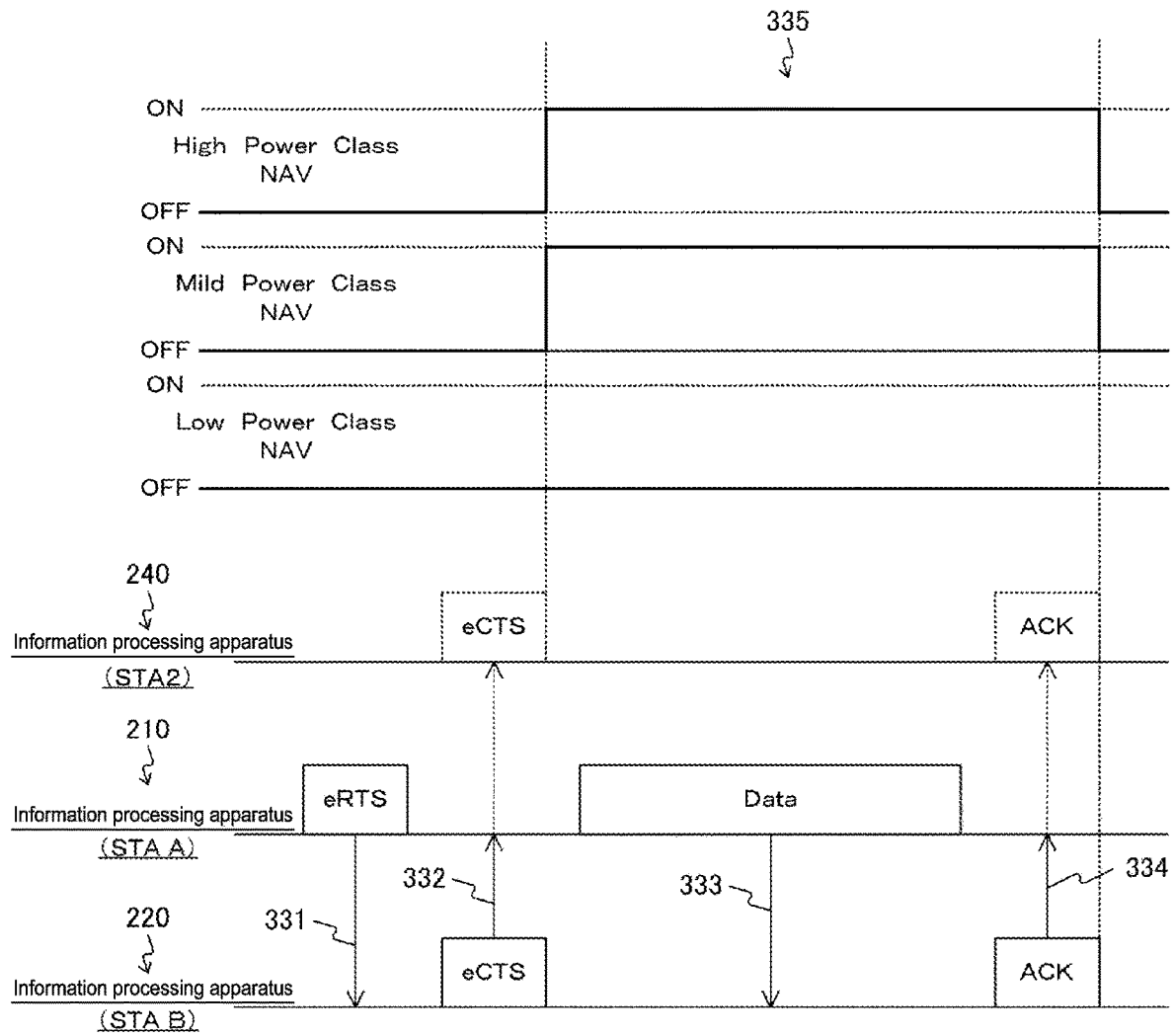
FIG. 6 is a diagram showing an example of setting a NAV for each transmission power by an information processing apparatus (STA2) 240 according to the embodiment of the present technology.

FIG. 6 is a diagram showing an example of setting a NAV for each transmission power by the information processing apparatus (STA2) 240 according to the embodiment of the present technology.

Note that since the exchange between the information processing apparatus (STA A) 210 and the information processing apparatus (STA B) 220 is similar to that in FIG. 5, detailed description thereof will be omitted here.

The information processing apparatus (STA2) 240 is capable of detecting the eCTS frame transmitted from the information processing apparatus (STA B) 220 (332). Therefore, after detecting the eCTS frame, the information processing apparatus (STA2) 240 is capable of grasping that the information processing apparatus (STA B) 220 is planning to receive a DATA frame. Further, it is preferable that the information processing apparatus (STA2) 240 refrains from performing transmission at the level (High/Mid) of inhibiting reception by the information processing apparatus (STA B) 220.

However, it is considered that the information processing apparatus (STA2) 240 is capable of performing transmission at the (Low) level lower than the level (High/Mid) of inhibiting the reception by the information processing apparatus (STA B) 220.

In this regard, the information processing apparatus (STA2) 240 sets the respective NAVs so as to be capable of continuing to perform transmission at the lowest (Low) level. Specifically, the information processing apparatus (STA2) 240 sets the High Power Class NAV and the Mid Power Class NAV to on, and maintains the off state of the Low Power Class NAV.

As described above, data (Data) transmission from the information processing apparatus (STA A) 210 to the information processing apparatus (STA B) 220 is performed (333) during a period (335) in which the High Power Class NAV and the Mid Power Class NAV have been set to on. Further, as necessary, receipt acknowledgement (Ack) is exchanged 334).

Further, the information processing apparatus (STA2) 240 in which the High Power Class NAV and the Mid Power Class NAV are set to on is capable of performing transmission at the lowest (Low) level by the information processing apparatus itself in the period (335).

[Example of Setting NAV for Each Transmission Power by Information Processing Apparatus (STA3)]

Figure 7:
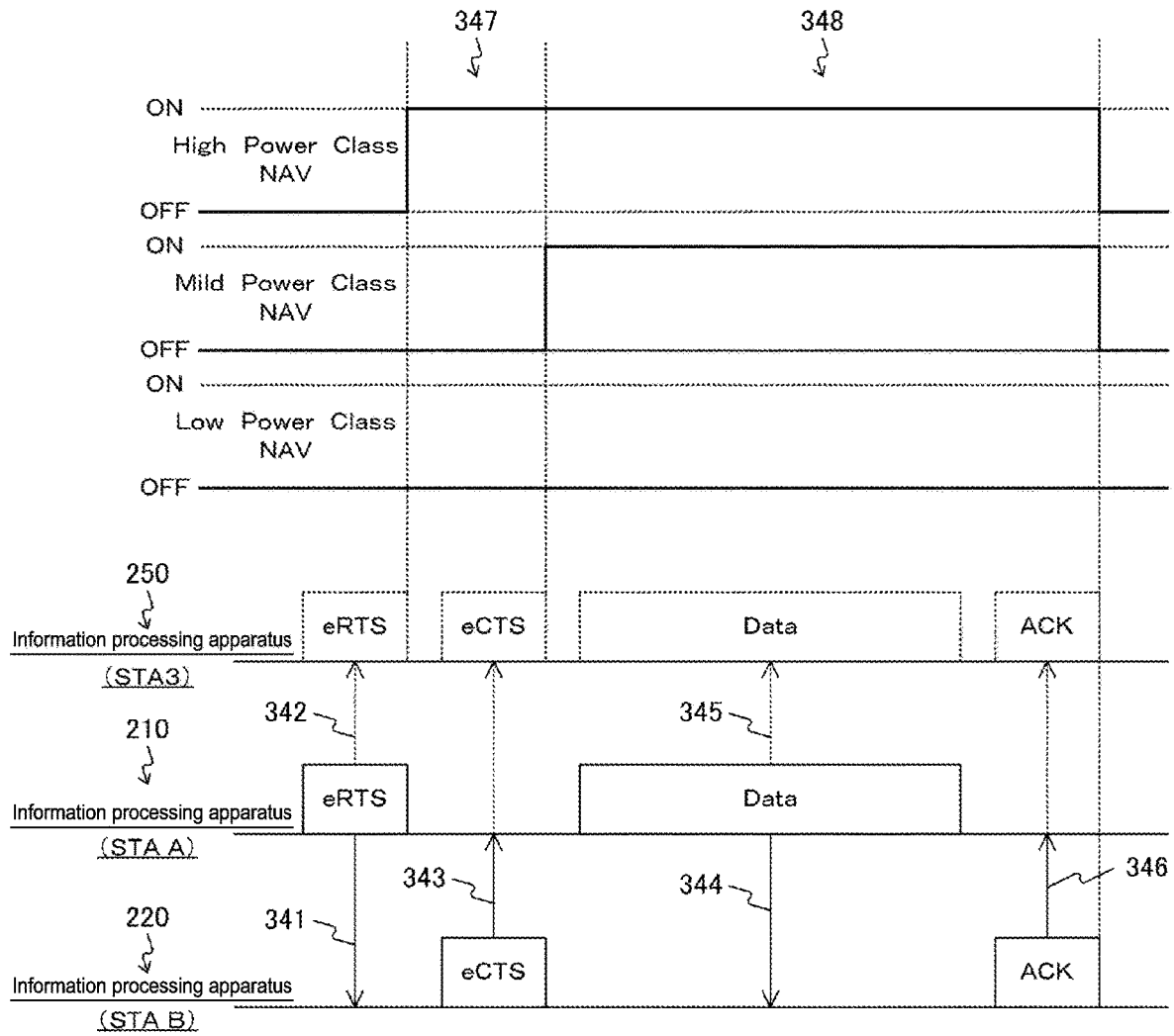
FIG. 7 is a diagram showing an example of setting a NAV for each transmission power by an information processing apparatus (STA3) 250 according to the embodiment of the present technology.

FIG. 7 is a diagram showing an example of setting a NAV for each transmission power by the information processing apparatus (STA3) 250 according to the embodiment of the present technology.

Note that since the exchange between the information processing apparatus (STA A) 210 and the information processing apparatus (STA B) 220 is similar to that in FIG. 5, detailed description thereof will be omitted here.

The information processing apparatus (STA3) 250 is capable of detecting the eRTS frame transmitted from the information processing apparatus (STA A) 210 (342). Therefore, similarly to the example shown in FIG. 5, the information processing apparatus (STA3) 250 sets the respective NAVs so as to be capable of continuing to perform transmission at the low (Mid/Low) level. Specifically, the information processing apparatus (STA3) 250 sets the High Power Class NAV to on, and maintains the off state of the Mid Power Class NAV and the Low Power Class NAV.

Further, the information processing apparatus (STA3) 250 is capable of detecting the eCTS frame transmitted from the information processing apparatus (STA B) 220 (343). Therefore, similarly to the example shown in FIG. 6, the information processing apparatus (STA3) 250 sets the respective NAVs so as to be capable of continuing to perform transmission at the lowest (Low) level. Specifically, the information processing apparatus (STA3) 250 sets the High Power Class NAV and the Mid Power Class NAV to on, and maintains the off state of the Low Power Class NAV.

As described above, when receiving a plurality of frames for setting a NAV, the information processing apparatus (STA3) 250 takes the OR thereof.

That is, the information processing apparatus (STA3) 250 is capable of performing transmission at the low (Mid/Low) level by the information processing apparatus itself in the period (347) in which the High Power Class NAV is set to on.

Further, the information processing apparatus (STA3) 250 is capable of performing transmission at the lowest (Low) level in the period (348) in which the High Power Class NAV and the Mid Power Class NAV are set to on.

[Example of Setting NAV with CTS-to-Self]

Figure 8:
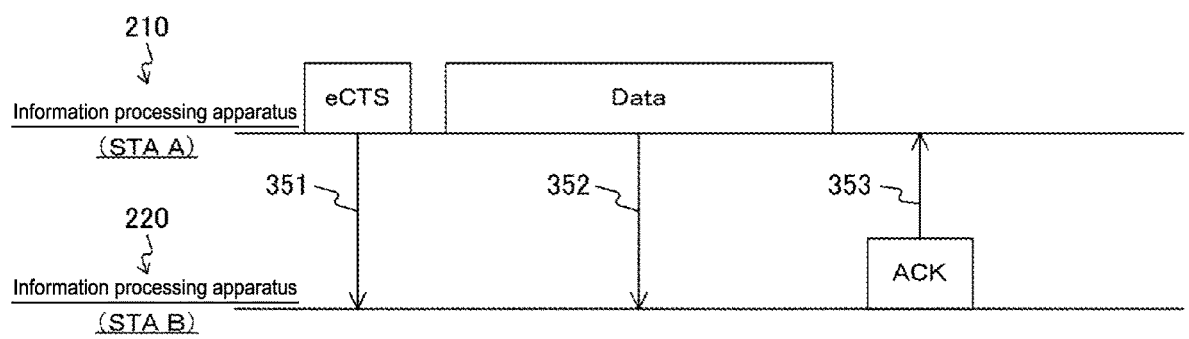
FIG. 8 is a diagram showing a setting example in the case where an information processing apparatus (STA A) 210 according to the embodiment of the present technology sets a NAV with CTS-to-Self.

FIG. 8 is a diagram showing a setting example in the case where the information processing apparatus (STA A) 210 according to the embodiment of the present technology sets a NAV with CTS-to-Self.

In FIG. 8, an example of a case (CTS-to-Self) where the information processing apparatus (STA A) 210 transmits a DATA frame after transmitting an eCTS frame (351) will be shown.

As described above, the apparatus (information processing apparatus (STA A) 210) that transmits an eCTS frame transmits a DATA frame in some cases. In this regard, an apparatus that transmits a frame (e.g., eCTS frame) to which a NAV is set may describe, in the frame to which a NAV is set, information representing whether it is planning to transmit or receive a DATA frame after transmitting the frame. Further, the apparatus that transmits the frame to which a NAV is set may describe, in the frame to which a NAV is set, information representing whether or not the target DATA frame is to be exchanged in the network to which the information processing apparatus itself belongs. These pieces of information can be stored in, for example, the Reuse Info 173 shown in FIG. 2.

Further, it is conceivable that the length, modulation method, and importance of the DATA frame to be transmitted/received are described in the RTS frame and the CTS frame to cause the peripheral apparatus to set a NAV for each transmission power. For example, in the case of transmitting data that should not be interfered with as the DATA frame, the importance of the DATA frame can be set to the highest rank.

[Example of Reusing Frequency by Notification of DATA Frame Length]

Figure 9:
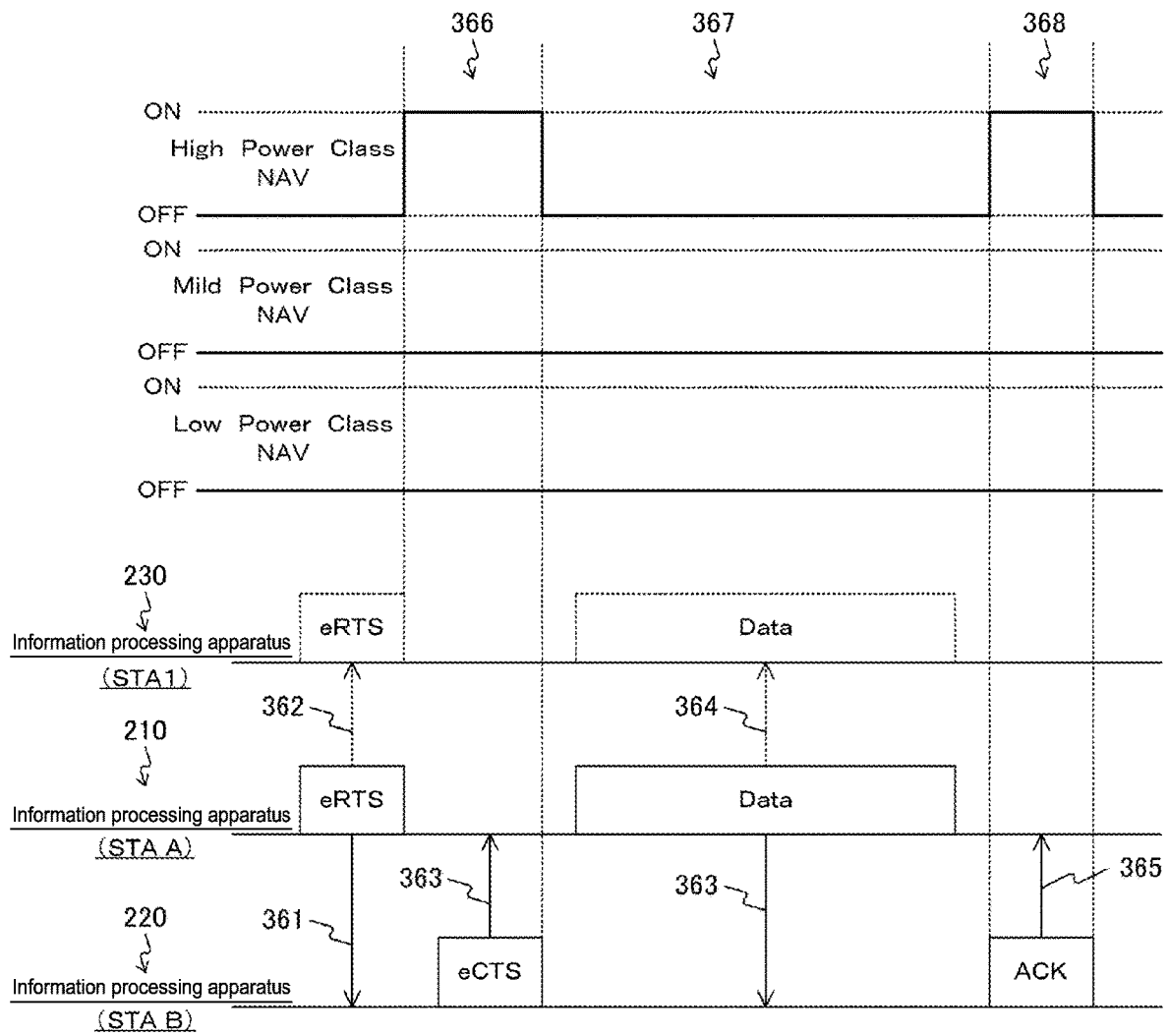
FIG. 9 is a diagram showing an example of setting a NAV for each transmission power by the information processing apparatus (STA1) 230 according to the embodiment of the present technology.

FIG. 9 is a diagram showing an example of setting a NAV for each transmission power by the information processing apparatus (STA1) 230 according to the embodiment of the present technology.

Note that since the exchange between the information processing apparatus (STA A) 210 and the information processing apparatus (STA B) 220 is similar to that in FIG. 5, detailed description thereof will be omitted here.

For example, a case where the information processing apparatus (STA A) 210 is planning to transmit a DATA frame by a modulation method resistant to interference will be considered. In this case, the information processing apparatus (STA A) 210 is capable of describing, in an eRTS frame, information representing that transmission with a power class (e.g., one level higher class) higher than a normal power class can be accepted, and of transmitting the eRTS frame (361, 362). In this case, the information processing apparatus (STA1) 230 is capable of setting a NAV for each transmission power on the basis of the information included in the received eRTS frame (information representing that transmission with a power class higher than a normal power class can be accepted)

Further, the information processing apparatus (STA A) 210 is capable of describing, in the eRTS frame, information representing the DATA frame length, and of transmitting the eRTS frame (361, 362). As described above, by notifying the DATA frame length, it is possible to appropriately notify the peripheral apparatus of the reuse period (367). In this case, as shown in FIG. 9, the information processing apparatus (STA1) 230 is capable of performing transmission with the High Power class only in the reuse period (367).

Further, the peripheral apparatus that receives the frame to which a NAV is set is capable of setting a NAV for each transmission power on the basis of the reception power of the frame. For example, in the case of receiving the RTS frame with weak power, it is expected that that apparatus to receive the DATA is located at a position far enough. Therefore, the peripheral apparatus that receives the RTS frame with weak power is capable of performing setting of invalidating the high power class NAV (enabling transmission)

Further, by describing, in the CTS frame, the reception power of the RTS frame and the transmission power of the CTS frame, and transmitting the CTS frame, it is possible to more appropriately calculate the acceptable transmission power. For example, it is possible to calculate the relative distance between the transmission/reception apparatuses of DATA on the basis of the reception power of the RTS frame. Further, for example, it is possible to calculate the distance with the transmission apparatus of the CTS frame on the basis of the transmission power of the CTS frame.

For example, in the case where the reception power of the RTS frame is high (RTS frame is strongly received), it is possible to grasp that there is a transmission apparatus that transmits the DATA nearby. In this case, since there is a transmission apparatus that transmits the DATA nearby, it is possible to grasp that it can withstand somewhat strong interference.

Further, some incentive may be given to the apparatus having a function of transmitting a NAV setting frame (e.g., eRTS frame and eCTS frame shown in FIG. 5 to FIG. 9) that can accept such a risk of increasing the interference. As the incentive, for example, acceptance of setting of a NAV longer than the normal one or acceptance of transmission power stronger than the normal one may be added. Further, the addition of the incentive can be set on the standard of the apparatus, for example.

[Correspondence Example of Received Frame and Power Class NAV]

FIG. 10 is a diagram showing an example of a correspondence relationship between the frame received by the information processing apparatus 100 according to the embodiment of the present technology, and a Power Class NAV set in the information processing apparatus 100.

As described above, the information processing apparatus 100 is capable of setting a Power Class NAV on the basis of the attribution (type of the frame) of the received frame. The setting example will be shown in FIG. 11.

[Operational Example of Information Processing Apparatus]

Figure 11:
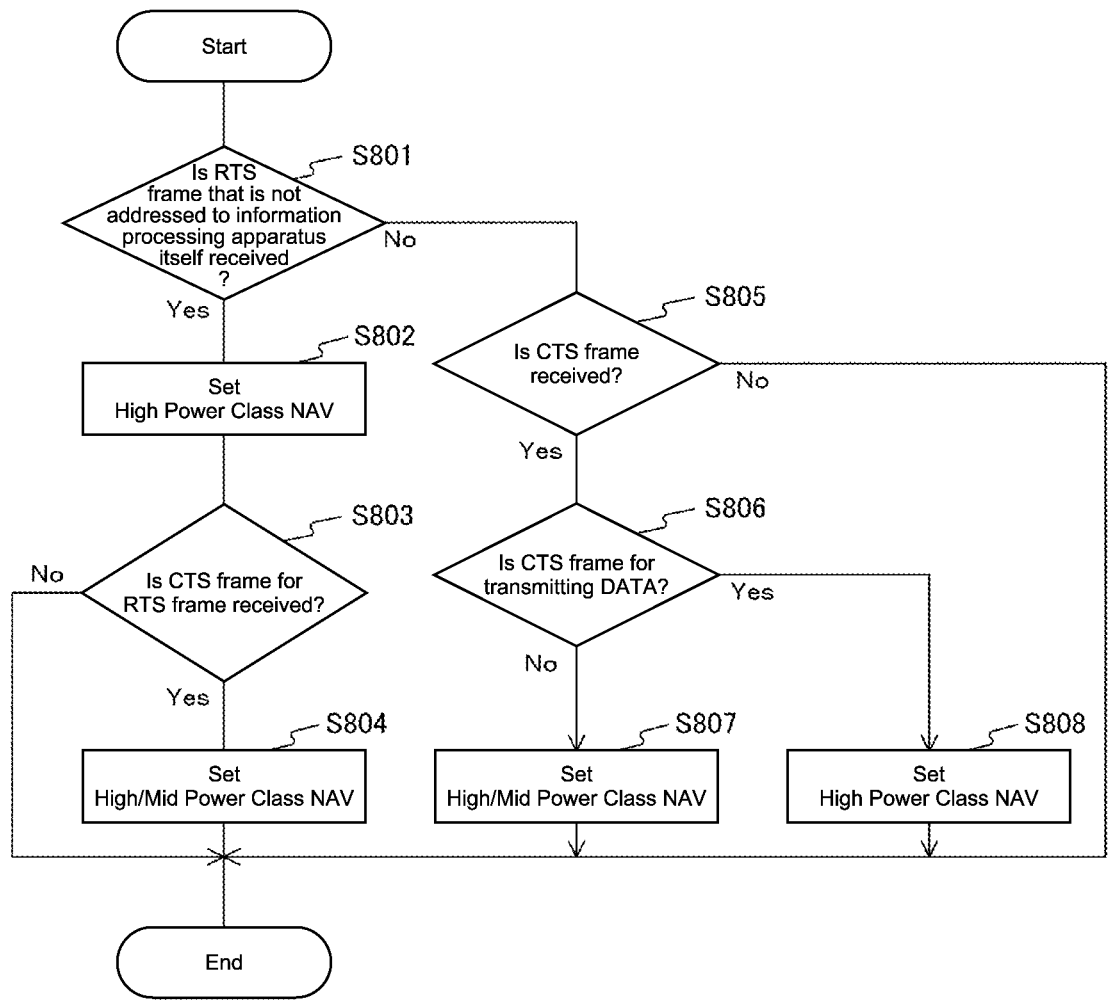
FIG. 11 is a flowchart showing an example of a processing procedure of processing of setting a Power Class NAV by the information processing apparatus 100 according to the embodiment of the present technology.

FIG. 11 is a flowchart showing an example of a processing procedure of processing of setting a Power Class NAV by the information processing apparatus 100 according to the embodiment of the present technology.

First, the control unit 160 determines whether or not an RTS frame that is not addressed to the information processing apparatus itself is received (Step S801). In the case of receiving an RTS frame that is not addressed to the information processing apparatus itself (Step S801), the control unit 160 sets the High Power Class NAV to on (Step S802).

Next, the control unit 160 determines whether or not a CTS frame for the received RTS frame is received (Step S803). In the case of receiving the CTS frame (Step S803), the control unit 160 sets both the High Power Class NAV and the Mid Power Class NAV to on (Step S804). In the case of not receiving the CTS frame (Step S803), the operation of Power Class NAV setting processing is finished.

Further, in the case of not receiving an RTS frame that is not addressed to the information processing apparatus itself (Step S801), the control unit 160 determines whether or not a CTS frame is received (Step S805). In the case of receiving a CTS frame (Step S805), the control unit 160 determines whether or not the CTS frame is a frame for performing DATA transmission (e.g., CTS-to-Self) (Step S806). For example, the control unit 160 is capable of determining whether or not the CTS frame is a frame for performing DATA transmission on the basis of information included in the CTS frame (e.g., DATA transmission flag (Tx Flag)).

In the case where the CTS frame is not a frame for performing DATA transmission (Step S806), the control unit 160 sets both the High Power Class NAV and the Mid Power Class NAV to on (Step S807).

In the case where the CTS frame is a frame for performing DATA transmission (Step S806), the control unit 160 sets the High Power Class NAV to on (Step S808).

[Example of Setting Power Class NAV Depending on Frame Type and Tx/Rx Flag]

Figure 12:
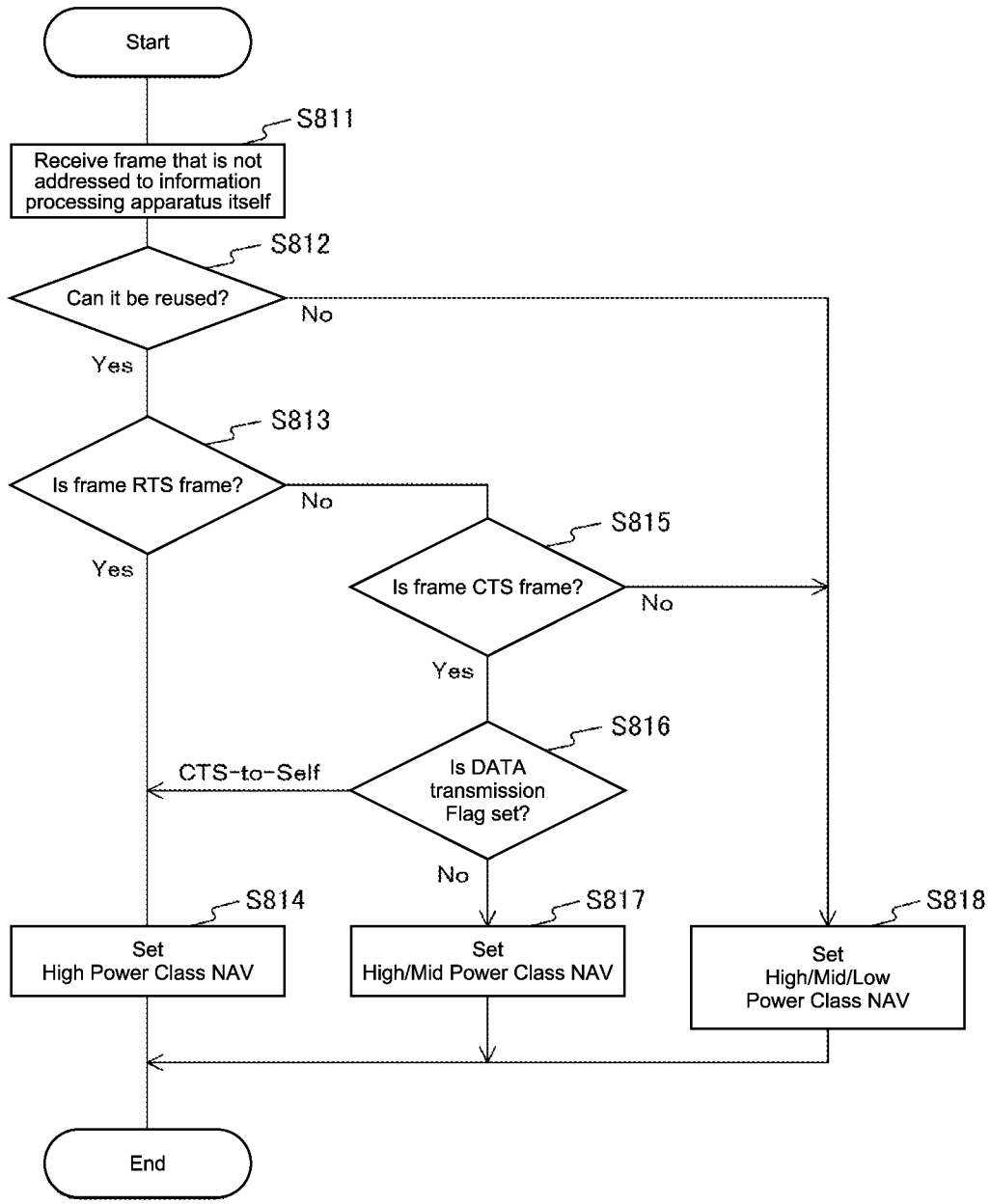
FIG. 12 is a flowchart showing an example of the processing procedure of processing of setting a Power Class NAV by the information processing apparatus 100 according to the embodiment of the present technology.

FIG. 12 is a flowchart showing an example of the processing procedure of processing of setting a Power Class NAV by the information processing apparatus 100 according to the embodiment of the present technology. In FIG. 12, an example of setting a power class NAV depending on a frame type and Tx/Rx Flag is shown. Further, this processing is performed every time a frame that is not addressed to the information processing apparatus itself is received.

First, the information processing apparatus 100 receives a frame that is not addressed to the information processing apparatus itself (Step S811). Next, the control unit 160 determines whether or not the received frame stores information representing that a reuse period can be set (Step S812). In the case where the received frame does not store information representing that a reuse period can be set (Step S812), the control unit 160 sets the respective Power Class NAVs to on (Step S818). That is, the High Power Class NAV, the Mid Power Class NAV, and the Low Power Class NAV are set to on.

In the case where the received frame stores information representing that a reuse period can be set (Step S812), the control unit 160 determines whether or not the received frame is an RTS frame (Step S813). In the case where the received frame is an RTS frame (Step S813), the control unit 160 sets the High Power Class NAV to on (Step S814).

In the case where the received frame is not an RTS frame (Step S813), the control unit 160 determines whether or not the received frame is a CTS frame (Step S815). In the case where the received frame is not a CTS frame (Step S815), the processing proceeds to Step S818.

In the case where the received frame is a CTS frame (Step S815), the control unit 160 determines whether or not a DATA transmission flag (Tx Flag) is set in the received CTS frame (Step S816). In the case where a DATA transmission flag is set in the received CTS frame (Step S816), the control unit 160 sets the High Power Class NAV to on (Step S814).

In the case where a DATA transmission flag is not set in the received CTS frame (Step S816), the control unit 160 sets both the High Power Class NAV and the Mid Power Class NAV to on (Step S817).

As described above, in the case of receiving a frame (frame that is not addressed to the information processing apparatus itself) for setting a transmission suppression period, the control unit 160 is capable of controlling a transmission suppression period for each of a plurality of transmission power levels on the basis of the frame. Specifically, the control unit 160 is capable of controlling the transmission suppression period for each of the plurality of transmission power levels on the basis of the attribution of the frame. Further, the control unit 160 is capable of controlling the transmission suppression period for each of the plurality of transmission power levels on the basis of information (e.g., information representing that it is a CTS frame for performing DATA transmission) included in the frame.

[Example of Setting Power Class NAV Depending on Data Length to be Transmitted]

Figure 13:
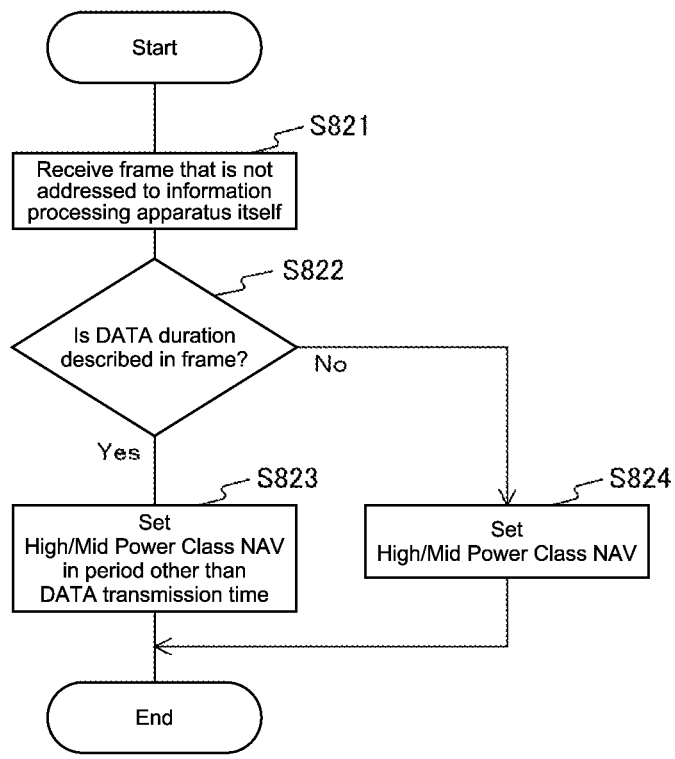
FIG. 13 is a flowchart showing an example of the processing procedure of processing of setting a Power Class NAV by the information processing apparatus 100 according to the embodiment of the present technology.

FIG. 13 is a flowchart showing an example of the processing procedure of processing of setting a Power Class NAV by the information processing apparatus 100 according to the embodiment of the present technology. In FIG. 13, an example of setting a Power Class NAV depending on DATA length to be transmitted is shown. Further, this processing is performed every time a frame that is not addressed to the information processing apparatus itself is received.

First, the information processing apparatus 100 receives a frame that is not addressed to the information processing apparatus itself (Step S821). Next, the control unit 160 determines whether or not the received frame stores information representing a DATA duration (Step S822).

In the case where the received frame stores information representing a DATA duration (Step S822), the control unit 160 sets both the High Power Class NAV and the Mid Power Class NAV toon (Step S823) in a period other than the DATA transmission time. That is, at the time of transmitting a CTS frame and an ACK frame, the control unit 160 sets both the High Power Class NAV and the Mid Power Class NAV to on (Step S823).

In the case where the received frame does not store information representing a DATA duration (Step S822), the control unit 160 sets both the High Power Class NAV and the Mid Power Class NAV to on (Step S824).

As described above, the control unit 160 is capable of controlling a transmission suppression period for each of a plurality of transmission power levels on the basis of information included in the received frame. Specifically, the control unit 160 is capable of controlling, in the case where the received frame includes the size (DATA duration) of data, the transmission suppression period for each of the plurality of transmission power levels, in a period specified on the basis of the size of the data.

[Example of Setting Power Class NAV Depending on Method of Modulating DATA to be Transmitted]

Figure 14:
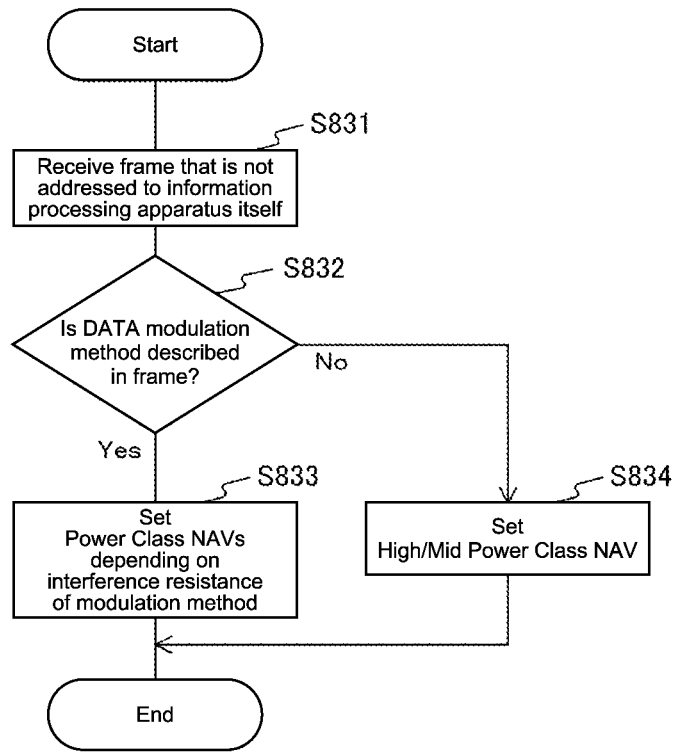
FIG. 14 is a flowchart showing an example of the processing procedure of processing of setting a Power Class NAV by the information processing apparatus 100 according to the embodiment of the present technology.

FIG. 14 is a flowchart showing an example of the processing procedure of processing of setting a Power Class NAV by the information processing apparatus 100 according to the embodiment of the present technology. In FIG. 14, an example of setting a Power Class NAV depending on a method of modulating DATA to be transmitted is shown. Further, this processing is performed every time a frame that is not addressed to the information processing apparatus itself is received.

First, the information processing apparatus 100 receives a frame that is not addressed to the information processing apparatus itself (Step S831). Next, the control unit 160 determines whether or not the received frame stores information representing a DATA modulation method (Step S832).

In the case where the received frame stores information representing a DATA modulation method (Step S832), the control unit 160 sets the respective Power Class NAVs depending on interference resistance of the DATA modulation method (Step S833).

In the case where the received frame does not store information representing a DATA modulation method (Step S832), the control unit 160 sets both the High Power Class NAV and the Mid Power Class NAV to on (Step S834).

As described above, the control unit 160 is capable of controlling a transmission suppression period for each of a plurality of transmission power levels on the basis of information included in the received frame. Specifically, the control unit 160 is capable of controlling, in the case where the received frame includes a modulation method of data, the transmission suppression period for each of the plurality of transmission power levels on the basis of interference resistance of the modulation method of the data.

[Example of Setting Power Class NAV Depending on Importance of DATA to be Transmitted]

Figure 15:
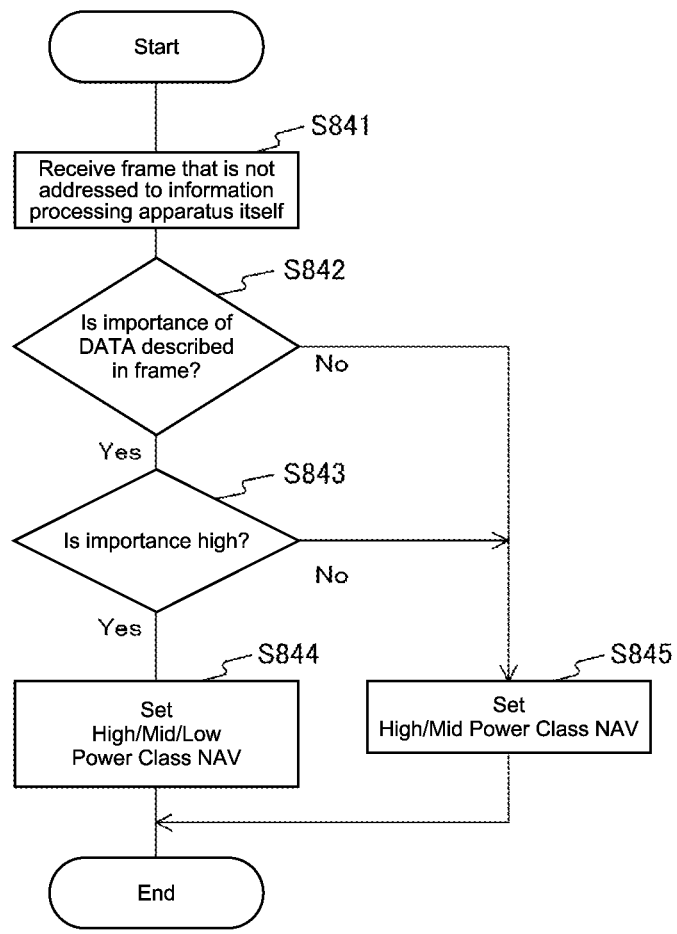
FIG. 15 is a flowchart showing an example of the processing procedure of processing of setting a Power Class NAV by the information processing apparatus 100 according to the embodiment of the present technology.

FIG. 15 is a flowchart showing an example of the processing procedure of processing of setting a Power Class NAV by the information processing apparatus 100 according to the embodiment of the present technology. In FIG. 15, an example of setting a Power Class NAV depending on the importance of DATA to be transmitted is shown. Further, this processing is performed every time a frame that is not addressed to the information processing apparatus itself is received.

First, the information processing apparatus 100 receives a frame that is not addressed to the information processing apparatus itself (Step S841). Next, the control unit 160 determines whether or not the received frame stores information representing the importance of DATA (Step S842).

In the case where the received frame stores information representing the importance of DATA (Step S842), the control unit 160 determines whether or not the importance is high (e.g., high with a threshold value as a reference).

In the case where the importance is high (Step S843), the control unit 160 sets the High Power Class NAV, the Mid Power Class NAV, and the Low Power Class NAV to on (Step S844).

In the case where the received frame does not store information representing the importance of DATA (Step S842) or the importance is low (Step S843), the control unit 160 sets both the High Power Class NAV and the Mid Power Class NAV to on (Step S845).

As described above, the control unit 160 is capable of controlling a transmission suppression period for each of a plurality of transmission power levels on the basis of information included in the received frame. Specifically, the control unit 160 is capable of setting, in the case where the received frame includes the importance of data and the importance is higher than a reference, the lowest transmission power level among the plurality of transmission power levels.

[Example of Setting Power Class NAV Depending on Reception Power of Frame]

Figure 16:
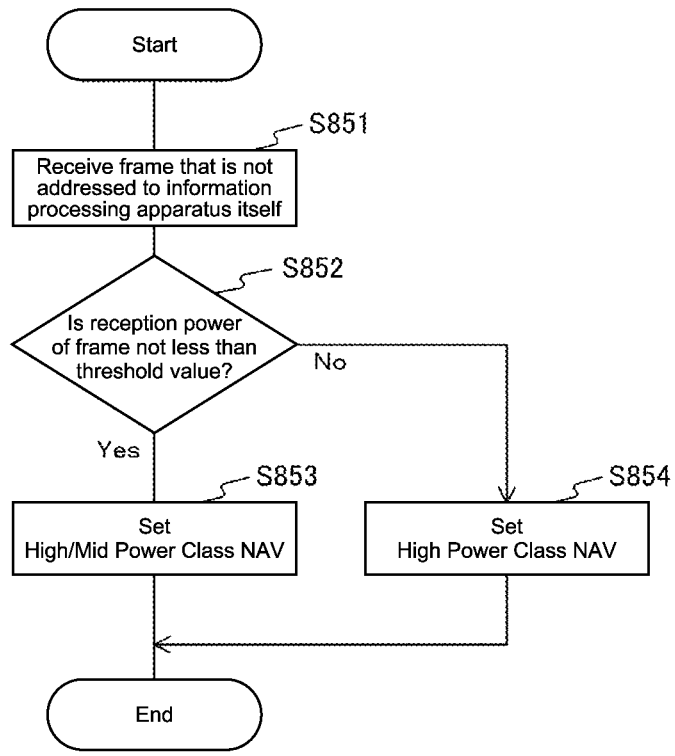
FIG. 16 is a flowchart showing an example of the processing procedure of processing of setting a Power Class NAV by the information processing apparatus 100 according to the embodiment of the present technology.

FIG. 16 is a flowchart showing an example of the processing procedure of processing of setting a Power Class NAV by the information processing apparatus 100 according to the embodiment of the present technology. In FIG. 16, an example of setting a Power Class NAV depending on reception power of a frame is shown. Further, this processing is performed every time a frame that is not addressed to the information processing apparatus itself is received.

First, the information processing apparatus 100 receives a frame that is not addressed to the information processing apparatus itself (Step S851). Next, the control unit 160 determines whether or not reception power of the received frame is not less than a threshold value (Step S852).

In the case where the reception power of the received frame is not less than the threshold value (Step S852), the control unit 160 sets both the High Power Class NAV and the Mid Power Class NAV to on (Step S853).

In the case where the reception power of the received frame is less than the threshold value (Step S852), the control unit 160 sets the High Power Class NAV to on (Step S854).

As described above, the control unit 160 is capable of a transmission suppression period for each of a plurality of transmission power levels on the basis of reception power of the received frame.

[Example of Setting Power Class NAV Depending on Relative Distance Between DATA Transmission/Reception Apparatuses]

Figure 17:
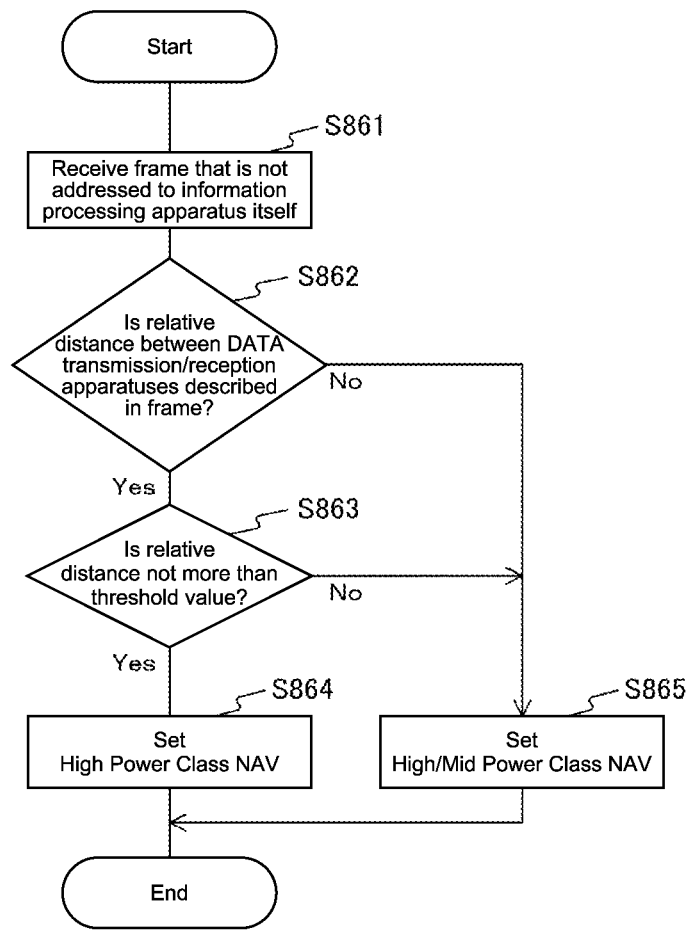
FIG. 17 is a flowchart showing an example of the processing procedure of processing of setting a Power Class NAV by the information processing apparatus 100 according to the embodiment of the present technology.

FIG. 17 is a flowchart showing an example of the processing procedure of processing of setting a Power Class NAV by the information processing apparatus 100 according to the embodiment of the present technology. In FIG. 17, an example of setting a Power Class NAV depending on a relative distance between DATA transmission/reception apparatuses is shown. Further, this processing is performed every time a frame that is not addressed to the information processing apparatus itself is received.

Note that the relative distance between DATA transmission/reception apparatuses can be calculated on the basis of, for example, reception power of a frame.

First, the information processing apparatus 100 receives a frame that is not addressed to the information processing apparatus itself (Step S861). Next, the control unit 160 determines whether or not the received frame stores information representing a relative distance between DATA transmission/reception apparatuses (Step S862).

In the case where the received frame stores information representing a relative distance between DATA transmission/reception apparatuses (Step S862), the control unit 160 determines whether or not the relative distance is not more than a threshold value (Step S863).

In the case where the relative distance is not more than the threshold value (Step S863), the control unit 160 sets the High Power Class NAV to on (Step S864).

In the case where the received frame does not store information representing a relative distance between DATA transmission/reception apparatuses (Step S862) or the relative distance exceeds the threshold value (Step S863), the control unit 160 sets the High Power Class NAV and the Mid Power Class NAV to on (Step S865).

As described above, the control unit 160 is capable of controlling a transmission suppression period for each of a plurality of transmission power levels on the basis of information included in the received frame. Specifically, the control unit 160 is capable of setting, in the case where the received frame includes the distance between the transmission apparatus that transmits the data and the reception apparatus that receives the data and the distance is shorter than a reference, the highest transmission power level among the plurality of transmission power levels.

[Operational Example of Transmission Apparatus of Response Frame]

Figure 18:
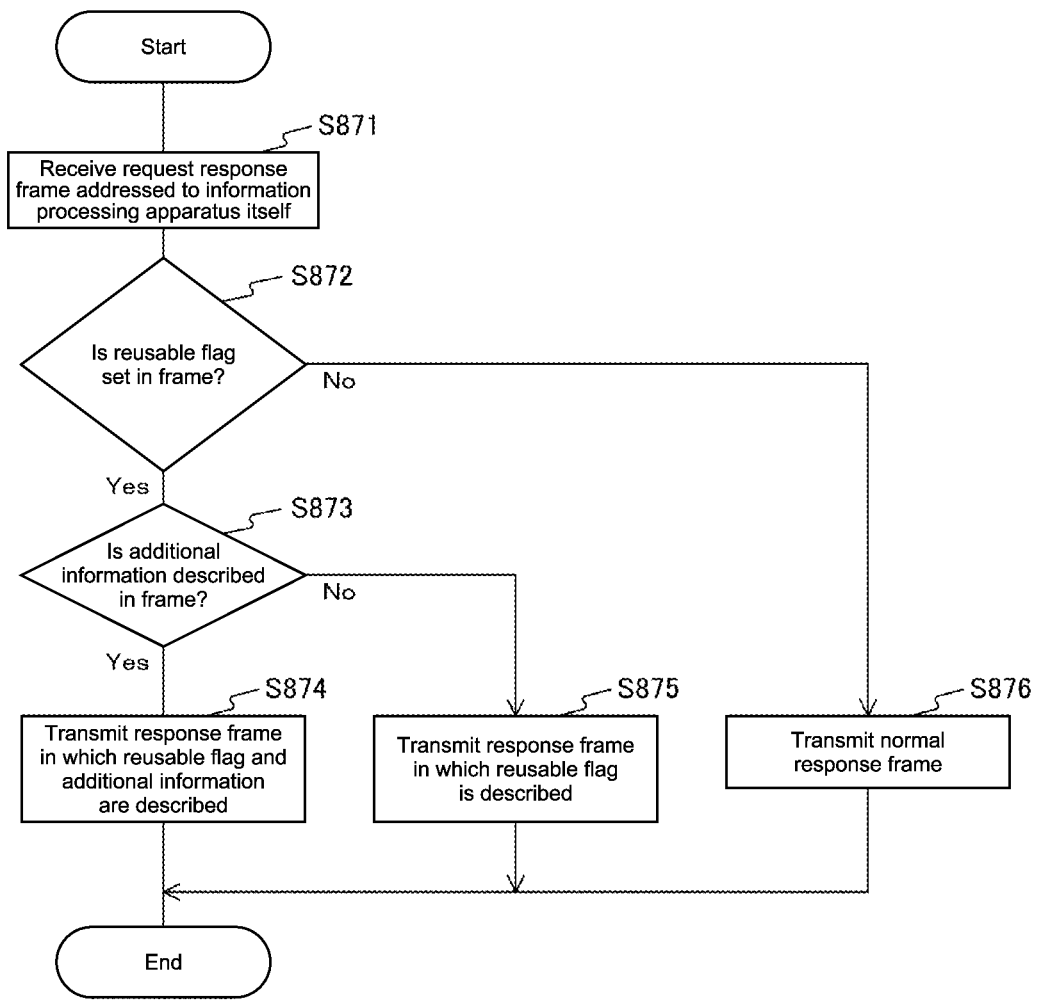
FIG. 18 is a flowchart showing an example of a processing procedure of processing of transmitting a response frame by the information processing apparatus 100 according to the embodiment of the present technology.

FIG. 18 is a flowchart showing an example of a processing procedure of processing of transmitting a response frame by the information processing apparatus 100 according to the embodiment of the present technology. Further, this processing is performed every time a request response frame addressed to the information processing apparatus itself is received.

First, the information processing apparatus 100 receives a request response frame addressed to the information processing apparatus itself (Step S871). Next, the control unit 160 determines whether or not a reusable flag is set in the received frame (Step S872). The reusable flag is an example of information representing that a reuse period can be set.

In the case where a reusable flag is set in the received frame (Step S872), the control unit 160 determines whether or not additional information is described the received frame (Step S873). Note that the additional information is, for example, information (e.g., information of the Reuse Info 173 shown in FIG. 2) used when controlling a transmission suppression period for each of a plurality of transmission power levels.

In the case where the additional information is described in the received frame (Step S873), the control unit 160 transmits a response frame in which the reusable flag and the additional information are described (Step S874).

In the case where the additional information is not described in the received frame (Step S873), the control unit 160 transmits a response frame in which the reusable flag is described (Step S875).

In the case where a reusable flag is not set in the received frame (Step S872), the control unit 160 transmits a normal response frame (Step S876).

Further, in the case of receiving a request response frame addressed to the information processing apparatus itself (Step S871), the control unit 160 may measure the reception power of the frame, and transmit a response frame in which the reception power and the transmission power of the response frame are described (Steps S874 and S875). For example, in the case of receiving an RTS frame addressed to the information processing apparatus itself, the control unit 160 is capable of measuring the reception power of the RTS frame, and transmitting a CTS frame in which the reception power and the transmission power of the CTS frame are described.

As described above, the control unit 160 is capable of performing control of recording reception power of a first frame for requesting data transmission and transmission power of a second frame to be transmitted in response to the first frame, in the second frame, and of transmitting the second frame. Further, the control unit 160 is capable of performing, in the case of receiving a frame for setting a transmission suppression period, control of recording, in the second frame, information (reusable flag) for notifying that a transmission suppression period for each of a plurality of transmission power levels is allowed to be controlled on the basis of the frame, and of transmitting the second frame. Further, the control unit 160 is capable of performing control of recording, in the second frame, information (additional information) to be used when controlling the transmission suppression period for each of the plurality of transmission power levels, and of transmitting the second frame.

As described above, the information processing apparatus 100 holds information regarding each Power Class NAV (NAV information). For example, the control unit 160 is capable of causing the storage unit 150 to hold the NAV information.

Further, the control unit 160 may refer to the NAV information held at the timing of acquiring the transmission right, and determine whether or not communication with a communication partner apparatus can be performed with possible transmission power.

For example, the control unit 160 periodically or irregularly calculates the distance to a communication partner apparatus, and hold the distance. For example, it is possible to calculate the distance to the communication partner apparatus on the basis of reception power of a beacon transmitted from the communication partner apparatus.

Then, the control unit 160 determines whether or not communication with the communication partner apparatus can be performed on the basis of the held NAV information and the distance to the communication partner apparatus.

For example, the control unit 160 may prohibit transmission in the case where the distance to the communication partner apparatus is not less than a threshold value TH1. Further, for example, in the case where the distance to the communication partner apparatus is less than the threshold value TH1, the control unit 160 is capable of determining that transmission can be performed only when the High Power Class NAV is set to on.

Further, for example, in the case where the distance to the communication partner apparatus is less than the threshold value TH1 and not less than a threshold value TH2 (where TH2<TH1), the control unit 160 is capable of determining that transmission can be performed only when the Mid Power Class NAV or the High Power Class NAV are set to on.

Further, for example, in the case where the distance to the communication partner apparatus is less than the threshold value TH2, the control unit 160 is capable of determining that transmission can be performed only when the Power Class NAVs are set to on.

As described above, according to the embodiment of the present technology, it is possible to increase the reception opportunity in a transmission suppression period for a frame that is not addressed to the information processing apparatus itself, and improve the system throughput. Accordingly, it is possible to efficiently use wireless resources.

Note that although an example in which 3 stages of Power class are defined shown in the embodiment of the present technology, two stages of Power class or four or more stages of Power class may be defined and used.

Further, the embodiment of the present technology is applicable to wireless communication between in-vehicle apparatuses (e.g., vehicle-to-vehicle communication and vehicle to everything (V2X (vehicle to X))). In this case, in the case where a frame is received between in-vehicle apparatuses around the information processing apparatus itself, it is possible to set a Power Class NAV on the basis of the frame.

Further, each information processing apparatus (STA) in the embodiment of the present technology is applicable to an apparatus used in each field. For example, it is applicable to a wireless apparatus (e.g., car navigation apparatus, and smartphone) used in automobile. Further, as described above, for example, it is applicable to vehicle-to-vehicle communication and vehicle to everything communication (V2X). Further, for example, it is applicable to a learning apparatus (e.g., tablet terminal) used in an education field. Further, for example, it is applicable to a wireless apparatus (e.g., terminal of a cattle management system) used in an agriculture field. Similarly, for example, it is applicable to each wireless apparatus used in a sports field, a medical field, and the like.

2. Application Example

The technology according to the present disclosure is applicable to various products. For example, the information processing apparatus 100 and each information processing apparatus (STA) may be realized as a smartphone, a tablet PC (Personal Computer), a notebook PC, a mobile terminal such as a portable game terminal and a digital camera, a television receiver, a printer, a fixed terminal such as a digital scanner and network storage, and an on-vehicle terminal such as a car navigation apparatus. Further, the information processing apparatus 100 and each information processing apparatus (STA) may be realized as a terminal (also referred to as MTC (Machine Type Communication) terminal) that performs M2M (Machine To Machine) communication, such as a smart meter, a vending machine, a remote monitoring apparatus, and a POS (Point Of Sale) terminal. Further, the information processing apparatus 100 and each information processing apparatus (STA) may be a wireless communication module (e.g., integrated circuit module including one die) to be mounted on these terminals.

Meanwhile, for example, the information processing apparatus 100 and each information processing apparatus (STA) may be realized as a wireless LAN access point (also referred to as wireless base station) that has a router function or does not have a router function. Further, the information processing apparatus 100 and each information processing apparatus (STA) may be realized as a mobile wireless LAN router. Further, the information processing apparatus 100 and each information processing apparatus (STA) may be a wireless communication module (e.g., integrated circuit module including one die) to be mounted on these terminals.

2-1. First Application Example

Figure 19:
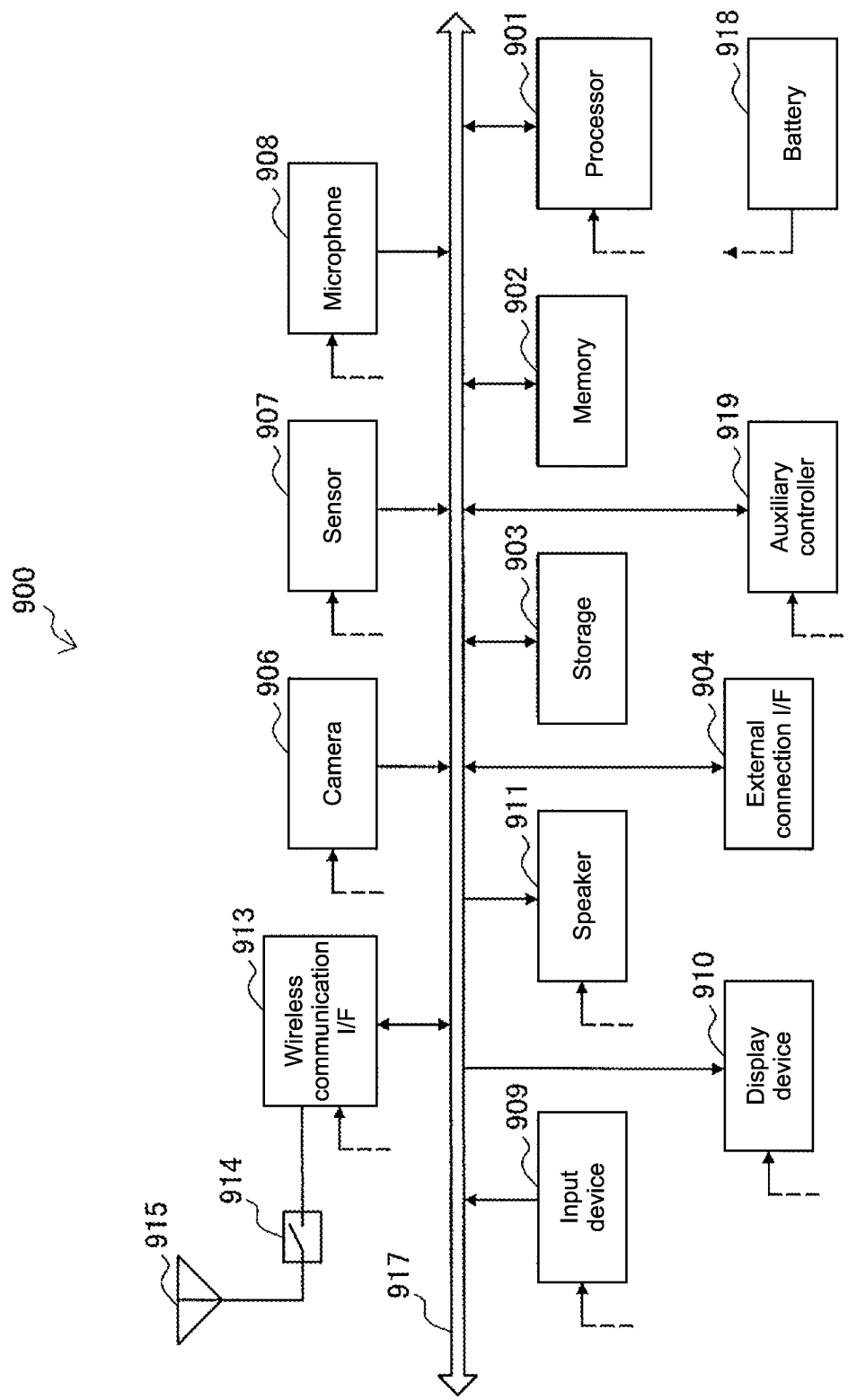
FIG. 19 is a block diagram showing an example of a schematic configuration of a smartphone.

FIG. 19 is a block diagram showing an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 controls may be, for example, a CPU (Central Processing Unit) or a SoC (System on Chip), and controls the function of an application layer and other layers of the smartphone 900. The memory 902 includes a RAM (Random Access Memory) and a ROM (Read Only Memory), and stores a program to be executed by the processor 901 and data. The storage 903 can include a storage medium such as a semiconductor memory and a hard disc. The external connection interface 904 is an interface for connecting an external device such as a memory card and a USB (Universal Serial Bus) device to the smartphone 900.

The camera 906 includes, for example, an image sensor such as a CCD (Charge Coupled Device) or a CMOS (Complementary Metal Oxide Semiconductor), and generates an image. The sensor 907 can include, for example, a sensor group such as a position sensor, a gyro sensor, a geomagnetic sensor, and an acceleration sensor. The microphone 908 converts the sound input to the smartphone 900 into an audio signal. The input device 909 includes, for example, a touch sensor that detects a touch on a screen of the display device 910, a key pad, a keyboard, a button, a switch, or the like, and accepts an operation or information input from a user. The display device 910 includes a screen such as a liquid crystal display (LCD) and an organic light-emitting diode (OLED) display, and displays an output image of the smartphone 900. The speaker 911 converts the audio signal output from the smartphone 900 into sound.

The wireless communication interface 913 supports one or more wireless LAN standards such as IEEE802.11a, 11b, 11g, 11n, 11ac, and 11ad, and performs wireless communication. In an infrastructure mode, the wireless communication interface 913 is capable of communicating with another apparatus via a wireless LAN access point. Further, in an ad hoc mode or a direct communication mode such as Wi-Fi Direct, the wireless communication interface 913 is capable of directly communicating with another apparatus. Note that in the Wi-Fi Direct, although one of the two terminals operates as an access point unlike the ad hoc mode, communication is directly performed between the terminal. The wireless communication interface 913 can typically include a baseband processor, an RF (Radio Frequency) circuit, a power amplifier, and the like. The wireless communication interface 913 may be a one-chip module in which a memory that stores a communication control program, a processor that executes the program, and a related circuit are integrated. The wireless communication interface 913 may support another type of wireless communication method such as a near field communication method, proximity wireless communication method, and a cellular communication method in addition to the wireless LAN method. The antenna switch 914 switches the connection destination of the antenna 915 between a plurality of circuits (e.g., circuits for different wireless methods) included in the wireless communication interface 913. The antenna 915 includes one or more antenna devices (e.g., a plurality of antenna devices constituting an MIMO antenna), and is used for transmitting and receiving a wireless signal by the wireless communication interface 913.

Note that the smartphone 900 is not limited to the example shown in FIG. 19, and may include a plurality of antennas (e.g., antenna for wireless LAN and antenna for wireless communication method). In this case, the antenna switch 914 may be omitted from the configuration of the smartphone 900.

The processor 901, the memory 902, the storage 903, the external connection interface 904, the camera 906, the sensor 907, the microphone 908, the input device 909, the display device 910, the speaker 911, the wireless communication interface 913, and the auxiliary controller 919 are connected to each other through the bus 917. The battery 918 supplies power to the respective blocks of the smartphone 900 shown in FIG. 19 via a power supply line partially shown by broken lines in the figure. The auxiliary controller 919 operates the minimum necessary functions of the smartphone 900 in a sleep mode, for example.

In the smartphone 900 shown in FIG. 19, the control unit 160 described with reference to FIG. 1 may be implemented in the wireless communication interface 913. Further, at least a part of these functions may be implemented in the processor 901 or the auxiliary controller 919. For example, the smartphone 900 sets a Power Class NAV, thereby making it possible to reduce the power consumption of the battery 918. Further, the smartphone 900 sets a Power Class NAV, thereby making it possible to efficiently use wireless resources.

Note that the smartphone 900 may operate as a wireless access point (software AP) by the processor 901 executing an access point function at the application level. Further, the wireless communication interface 913 may have a wireless access point function.

2-2. Second Application Example

Figure 20:
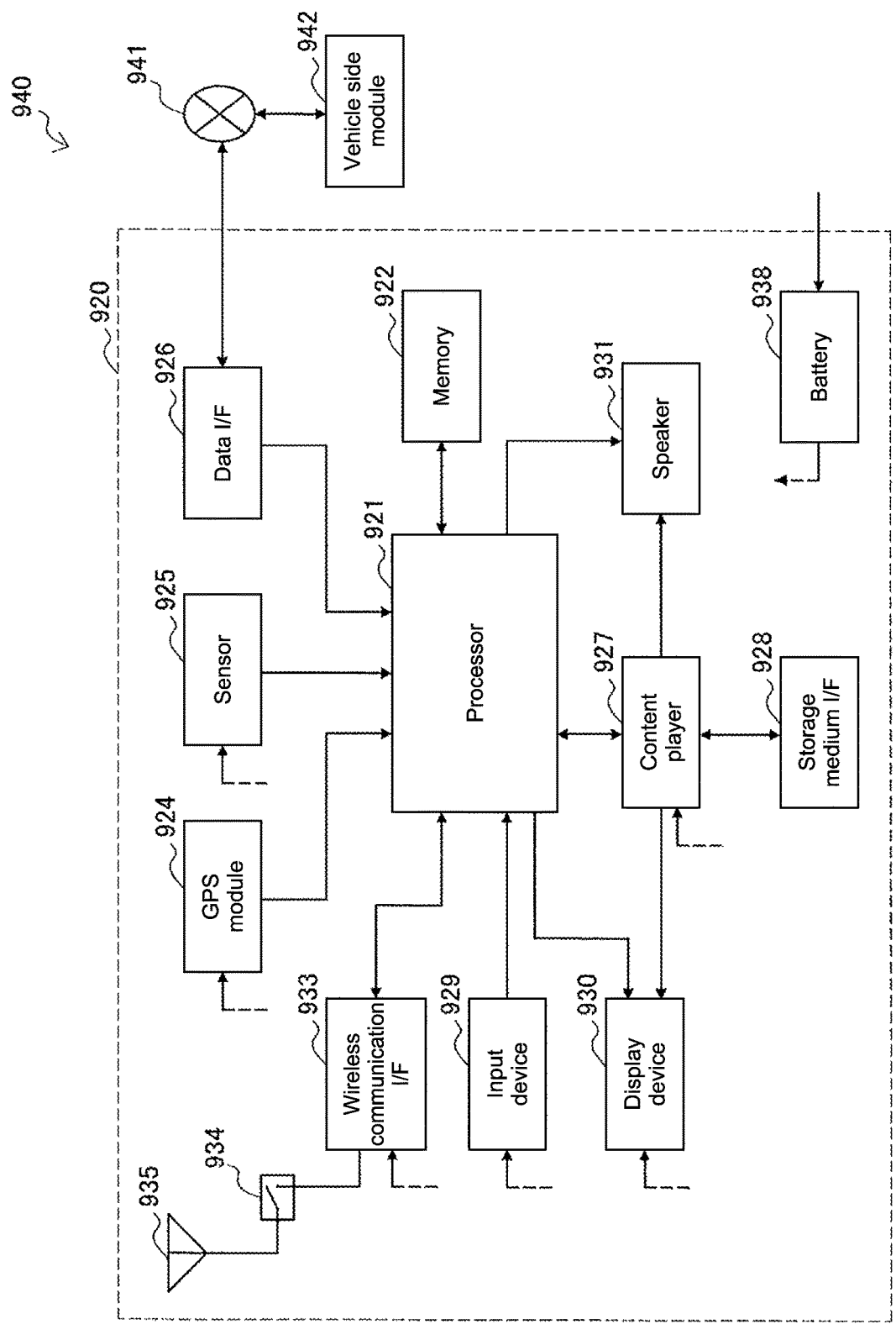
FIG. 20 is a block diagram showing an example of a schematic configuration of a car navigation apparatus.

FIG. 20 is a block diagram showing an example of a schematic configuration of a car navigation apparatus 920 to which the technology according to the present disclosure can be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls the navigation function and other functions of the car navigation apparatus 920. The memory 922 includes a RAM and a ROM, and stores a program to be executed by the processor 921 and data.

The GPS module 924 uses a GPS signal received from a GPS satellite to measure the position (e.g., latitude, longitude, and height) of the car navigation apparatus 920. The sensor 925 can include, for example, a sensor group such as a gyro sensor, a geomagnetic sensor, and an atmospheric pressure sensor. The data interface 926 is connected to, for example, an on-vehicle network 941 via a terminal (not shown), and acquires data generated on the vehicle side, such as vehicle speed data.

The content player 927 reproduces content stored in a storage medium (e.g., CD or DVD) to be inserted in the storage medium interface 928. The input device 929 includes, for example, a touch sensor that detects a touch on a screen of the display device 930, a button, a switch, or the like, and accepts an operation or information input from a user. The display device 930 includes a screen such as an LCD or an OLED display, and displays an image of the navigation function or content to be reproduced. The speaker 931 outputs audio of the navigation function or content to be reproduced.

The wireless communication interface 933 supports one or more wireless LAN standards such as IEEE802.11a, 11b, 11g, 11n, 11ac, and 11ad, and performs wireless communication. In an infrastructure mode, the wireless communication interface 933 is capable of communicating with another apparatus via a wireless LAN access point. Further, in an ad hoc mode or a direct communication mode such as Wi-Fi Direct, the wireless communication interface 933 is capable of directly communicating with another apparatus. The wireless communication interface 933 can typically include a baseband processor, an RF circuit, a power amplifier, and the like. The wireless communication interface 933 may be a one-chip module in which a memory that stores a communication control program, a processor that executes the program, and a related circuit are integrated. The wireless communication interface 933 may support another type of wireless communication method such as a near field communication method, proximity wireless communication method, and a cellular communication method in addition to the wireless LAN method. The antenna switch 934 switches the connection destination of the antenna 935 between a plurality of circuits included in the wireless communication interface 933. The antenna 935 includes one or more antenna devices, and is used for transmitting and receiving a wireless signal by the wireless communication interface 933.

Note that the car navigation apparatus 920 is not limited to the example shown in FIG. 20, and may include a plurality of antennas. In this case, the antenna switch 934 may be omitted from the configuration of the car navigation apparatus 920.

The battery 938 supplies power to the respective blocks of the car navigation apparatus shown in FIG. 20 via a power supply line partially shown by broken lines in the figure. Further, the battery 938 stores power supplied from the vehicle side.

In the car navigation apparatus shown n FIG. 20, the control unit 160 described with reference to FIG. 1 may be implemented in the wireless communication interface 933. Further, at least a part of these functions may be implemented in the processor 921. For example, the car navigation apparatus 920 sets a Power Class NAV, thereby making it possible to efficiently use wireless resources.

Further, the wireless communication interface 933 may operate as the above-mentioned information processing apparatus 100 or the like, and provide wireless connection to a terminal held by a user in a vehicle.

Further, the technology according to the present disclosure may be realized as an on-vehicle system (or vehicle) 940 including one or more blocks of the above-mentioned car navigation apparatus 920, the on-vehicle network 941, and a vehicle side module 942. The vehicle side module 942 generates vehicle side data such as vehicle speed, engine speed, and failure information, and outputs the generated data to the on-vehicle network 941.

2-3. Third Application Example

FIG. 21 is a block diagram showing an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and antenna 965.

The controller 951 may be, for example, a CPU or a DSP (Digital Signal Processor), and operates various functions (e.g., access restriction, routing, encryption, firewall, and log management) of the IP (Internet Protocol) layer and higher layers of the wireless access point 950. The memory 952 includes a RAM and a ROM, and stores a program to be executed by the controller 951, and various types of control data (e.g., a terminal list, a routing table, an encryption key, security setting, and a log).

The input device 954 includes, for example, a button, a switch, or the like, and accepts an operation from a user. The display device 955 includes a LED lamp or the like, and displays the operation status of the wireless access point 950.

The network interface 957 is a wired communication interface for the wireless access point 950 to connect to a wired communication network 958. The network interface 957 may include a plurality of connection terminals. The wired communication network 958 may be a LAN such as Ethernet (registered trademark) or a WAN (Wide Area Network).

The wireless communication interface 963 supports one or more wireless LAN standards such as IEEE802.11a, 11b, 11g, 11n, 11ac, and 11ad, and provides wireless connection to a near terminal as an access point. The wireless communication interface 963 can typically include a baseband processor, an RF circuit, a power amplifier, and the like. The wireless communication interface 963 may be a one-chip module in which a memory that stores a communication control program, a processor that executes the program, and a related circuit are integrated. The antenna switch 964 switches the connection destination of the antenna 965 between a plurality of circuits included in the wireless communication interface 963. The antenna 965 includes one or more antenna devices, and is used for transmitting and receiving a wireless signal by the wireless communication interface 963.

In the wireless access point 950 shown in FIG. 21, the control unit 160 described with reference to FIG. 1 may be implemented in the wireless communication interface 963. Further, at least a part of these functions may be implemented in the controller 951. For example, the wireless access point 950 sets a Power Class NAV, thereby making it possible to efficiently use wireless resources.

Note that the above-mentioned embodiments provide examples for embodying the present technology and the matters in the embodiments and the invention-specifying matters in the scope of claims are associated. Similarly, the invention-specifying matters in the scope of claims and the matters in the embodiments of the present technology, which are denoted by the identical names, have correspondence. It should be noted that the present technology is not limited to the embodiments and can be embodied by making various modifications to the embodiments without departing from its essence.

Further, the processing procedures described in the above embodiments may be construed as methods including those series of procedures or a program for causing a computer to execute those series of procedures or may be construed as a recording medium storing that program. As this recording medium, a CD (Compact Disc), an MD (Mini Disc), a DVD (Digital Versatile Disc), a memory card, and a Blu-ray (registered trademark) disc can be used, for example.

Note that the effects described herein are merely examples and not limitative and other effects may be provided.

It should be noted that the present technology may take the following configurations.

(1)

An information processing apparatus, including:
a control unit that controls, in a case of receiving a frame for setting a transmission suppression period, a transmission suppression period for each of a plurality of transmission power levels on the basis of the frame.

(2)

The information processing apparatus according to (1) above, in which
the control unit controls the transmission suppression period for each of the plurality of transmission power levels on the basis of an attribution of the frame.

(3)

The information processing apparatus according to (1) or (2) above, in which the control unit controls the transmission suppression period for each of the plurality of transmission power levels on the basis of reception power of the frame.

(4)

The information processing apparatus according to any one of (1) to (3) above, in which the control unit controls the transmission suppression period for each of the plurality of transmission power levels on the basis of information included in the frame.

(5)

The information processing apparatus according to (4) above, in which
the information included in the frame is at least one of information for identifying a data transmission side or a data reception side, a size of the data, a modulation method of the data, an importance of the data, and a distance between a transmission apparatus that transmits the data and a reception apparatus that receives the data.

(6)

The information processing apparatus according to (5) above, in which
the control unit controls, in a case where the frame includes the size of the data, the transmission suppression period for each of the plurality of transmission power levels, in a period specified on the basis of the size of the data.

(7)

The information processing apparatus according to (5) above, in which
the control unit controls, in a case where the frame includes the modulation method of the data, the transmission suppression period for each of the plurality of transmission power levels on the basis of interference resistance of the modulation method of the data.

(8)

The information processing apparatus according to (5) above, in which
the control unit sets, in a case where the frame includes the importance of the data and the importance of the data is higher than a reference, the lowest transmission power level among the plurality of transmission power levels.

(9)

The information processing apparatus according to (5) above, in which
the control unit sets, in a case where the frame includes the distance between the transmission apparatus that transmits the data and the reception apparatus that receives the data and the distance is shorter than a reference, the highest transmission power level among the plurality of transmission power levels.

(10)

An information processing apparatus, including:

a control unit that performs control of recording reception power of a first frame for requesting data transmission and transmission power of a second frame to be transmitted in response to the first frame, in the second frame, and of transmitting the second frame.

(11)

The information processing apparatus according to (10) above, in which the control unit performs, in a case of receiving a frame for setting a transmission suppression period, control of recording, in the second frame, information for notifying that a transmission suppression period for each of a plurality of transmission power levels is allowed to be controlled on the basis of the frame, and of transmitting the second frame.

(12)

The information processing apparatus according to (11) above, in which the control unit performs control of recording, in the second frame, information to be used when controlling the transmission suppression period for each of the plurality of transmission power levels, and of transmitting the second frame.

(13)

A communication system, including:

a first information processing apparatus that transmits a frame for setting a transmission suppression period;

a second information processing apparatus that controls, in a case of receiving the frame, a transmission suppression period for each of a plurality of transmission power levels on the basis of the frame.

(14)

An information processing method, including:

a control procedure of controlling, in a case of receiving a frame for setting a transmission suppression period, a transmission suppression period for each of a plurality of transmission power levels on the basis of the frame.

(15)

An information processing method, including:

a control procedure of performing control of recording reception power of a first frame for requesting data transmission and transmission power of a second frame to be transmitted in response to the first frame, in the second frame, and of transmitting the second frame.

(16)

A program that causes a computer to execute:

a control procedure of controlling, in a case of receiving a frame for setting a transmission suppression period, a transmission suppression period for each of a plurality of transmission power levels on the basis of the frame.

(17)

A program that causes a computer to execute:

a control procedure of performing control of recording reception power of a first frame for requesting data transmission and transmission power of a second frame to be transmitted in response to the first frame, in the second frame, and of transmitting the second frame.

REFERENCE SIGNS LIST 10 communication system
100 information processing apparatus
110 data processing unit
120 signal processing unit
130 wireless interface unit
140 antenna
150 storage unit
160 control unit
210 information processing apparatus (STA A)
220 information processing apparatus (STA B)
230 information processing apparatus (STA1)
240 information processing apparatus (STA2)
250 information processing apparatus (STA3)
900 smartphone
901 processor
902 memory
903 storage
904 external connection interface
906 camera
907 sensors
908 microphone
909 input device
910 display device
911 speaker
913 wireless communication interface
914 antenna switch
915 antenna
917 bus
918 battery
919 auxiliary controller
920 car navigation apparatus
921 processor
922 memory
924 GPS module
925 sensors
926 data interface
927 content player
928 storage medium interface
929 input device
930 display device
931 speaker
933 wireless communication interface
934 antenna switch
935 antenna
938 battery
941 on-vehicle network
942 vehicle side module
950 wireless access point
951 controller
952 memory
954 input device
955 display device
957 network interface
958 wired communication network
963 wireless communication interface
964 antenna switch
965 antenna

The invention claimed is:

1. An information processing apparatus, comprising:
circuitry configured to control, in a case of receiving a frame from a wireless network for setting a transmission suppression period, the transmission suppression period separately for each of a plurality of transmission power levels in accordance with the frame.

2. The information processing apparatus according to claim 1, wherein
the circuitry is configured to control the transmission suppression period for each of the plurality of transmission power levels in accordance with a type of the frame.

3. The information processing apparatus according to claim 1, wherein
the circuitry is configured to control the transmission suppression period for each of the plurality of transmission power levels in accordance with reception power of the frame.

4. The information processing apparatus according to claim 1, wherein
the circuitry is configured to control the transmission suppression period for each of the plurality of transmission power levels in accordance with information included in the frame.

5. The information processing apparatus according to claim 4, wherein
the information included in the frame is at least one of information for identifying a data transmission side or a data reception side, a size of the data, a modulation method of the data, a priority of the data, or a distance between a transmission apparatus that transmits the data and a reception apparatus that receives the data.

6. The information processing apparatus according to claim 5, wherein
the circuitry is configured to control, in a case where the frame includes the size of the data, the transmission suppression period for each of the plurality of transmission power levels, in a period specified in accordance with the size of the data.

7. The information processing apparatus according to claim 5, wherein
the circuitry is configured to control, in a case where the frame includes the modulation method of the data, the transmission suppression period for each of the plurality of transmission power levels in accordance with interference resistance of the modulation method of the data.

8. The information processing apparatus according to claim 5, wherein
the circuitry is configured to set, in a case where the frame includes the priority of the data and the priority of the data is higher than a reference, the lowest transmission power level among the plurality of transmission power levels.

9. The information processing apparatus according to claim 5, wherein
the circuitry is configured to set, in a case where the frame includes the distance between the transmission apparatus that transmits the data and the reception apparatus that receives the data and the distance is shorter than a reference, the highest transmission power level among the plurality of transmission power levels.

10. The information processing apparatus according to claim 1, wherein
the circuitry is configured to control transmission at one of the plurality of transmission power levels that is lower than another one of the transmission power levels for which the transmission suppression period is set.

11. An information processing apparatus, comprising:
circuitry configured to perform control of recording reception power of a first frame from a wireless network for requesting data transmission and transmission power of a second frame to be transmitted in response to the first frame, in the second frame, and of transmitting the second frame, wherein
the circuitry is configured to perform, in a case of receiving a frame for setting a transmission suppression period, control of recording, in the second frame, information for notifying that the transmission suppression period is allowed to be set separately for each of a plurality of transmission power levels in accordance with the frame for setting the transmission suppression period, and of transmitting the second frame.

12. The information processing apparatus according to claim 11, wherein
the circuitry is configured to perform control of recording, in the second frame, information to be used when controlling the transmission suppression period for each of the plurality of transmission power levels, and of transmitting the second frame.

13. An information processing method, comprising:
a control procedure of controlling, in a case of receiving a frame for setting a transmission suppression period from a wireless network, the transmission suppression period separately for each of a plurality of transmission power levels in accordance with the frame.

14. An information processing method, comprising:
a control procedure of performing control of recording reception power of a first frame in a wireless network for requesting data transmission and transmission power of a second frame to be transmitted in response to the first frame, in the second frame, and of transmitting the second frame, wherein
in a case of receiving a frame for setting a transmission suppression period, control is performed of recording in the second frame information for notifying that the transmission suppression period is allowed to be set separately for each of a plurality of transmission power levels in accordance with the frame for setting the transmission suppression period, and of transmitting the second frame.

* * * * *